United States Patent
Edge et al.

(10) Patent No.: US 10,805,784 B2
(45) Date of Patent: Oct. 13, 2020

(54) METHODS AND SYSTEMS FOR EFFICIENT LOCATION SUPPORT FOR WIRELESS EMERGENCY ALERTS

(71) Applicant: QUALCOMM Incorporated, San Diego, CA (US)

(72) Inventors: Stephen William Edge, Escondido, CA (US); Farrokh Khatibi, San Diego, CA (US); Kirk Allan Burroughs, Alamo, CA (US); James Deloach, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/260,469

(22) Filed: Jan. 29, 2019

(65) Prior Publication Data

US 2019/0246260 A1    Aug. 8, 2019

Related U.S. Application Data

(60) Provisional application No. 62/628,304, filed on Feb. 9, 2018, provisional application No. 62/627,241, filed on Feb. 7, 2018.

(51) Int. Cl.
*H04M 11/04*    (2006.01)
*H04W 4/90*    (2018.01)
(Continued)

(52) U.S. Cl.
CPC ............ *H04W 4/90* (2018.02); *G08B 27/006* (2013.01); *H04H 20/59* (2013.01); *H04H 60/51* (2013.01);
(Continued)

(58) Field of Classification Search
CPC ..... H04W 76/007; H04W 76/02; H04W 4/22; H04W 4/02; H04W 64/00; H04W 8/18; H04W 88/02; H04W 88/06; H04W 92/02
(Continued)

(56) References Cited

U.S. PATENT DOCUMENTS 9,398,619 B1 *   7/2016   Sennett ................... H04W 4/90
2009/0291630 A1 *  11/2009   Dunn ..................... H04L 12/189
                                                           455/3.01

FOREIGN PATENT DOCUMENTS

WO    2017064671 A1    4/2017

OTHER PUBLICATIONS

ATIS: "ATIS-0700027 Feasibility Study for WEA Cell Broadcast Geo-Targeting", Notice of Disclaimer & Limitation of Liability, Dec. 2, 2015 (Dec. 2, 2015), 56 Pages, XP055569441, Retrieved from the Internet: URL: https://access.atis.org/apps/group_public/download.php/25924/ATIS-0700027-FeasibilityStudy.pdf [retrieved on Mar. 14, 2019].
(Continued)

*Primary Examiner* — Temica M Beamer
(74) *Attorney, Agent, or Firm* — Hunter Clark PLLC

(57) ABSTRACT

Techniques are discussed herein for efficiently providing wireless emergency alerts (WEA) to a mobile device. The techniques include broadcasting a warning message from a base station in a wireless network within a cell for the base station and including an interior cell or exterior cell indication and a geographic area description for an external cell. A receiving mobile device may then display the warning message to a user either unconditionally when an interior cell is indicated or after verifying the mobile device is located within the geographic area for an exterior cell. The wireless network may determine interior versus exterior cell status by determining interior cells to be wholly within the
(Continued)

geographic area and exterior cells to be partly within the geographic area.

28 Claims, 11 Drawing Sheets

(51) Int. Cl.

| | | |
|---|---|---|
| *H04W 68/00* | (2009.01) | |
| *H04W 4/029* | (2018.01) | |
| *H04W 4/06* | (2009.01) | |
| *H04W 4/021* | (2018.01) | |
| *H04L 12/18* | (2006.01) | |
| *H04H 20/59* | (2008.01) | |
| *H04H 60/51* | (2008.01) | |
| *H04W 4/12* | (2009.01) | |
| *H04L 12/58* | (2006.01) | |
| *G08B 27/00* | (2006.01) | |

(52) U.S. Cl.
CPC ........ *H04L 12/189* (2013.01); *H04L 12/1845* (2013.01); *H04L 12/1886* (2013.01); *H04L 12/1895* (2013.01); *H04L 51/20* (2013.01); *H04L 51/38* (2013.01); *H04W 4/021* (2013.01); *H04W 4/029* (2018.02); *H04W 4/06* (2013.01); *H04W 4/12* (2013.01); *H04W 68/005* (2013.01)

(58) Field of Classification Search
USPC ......... 455/404.1, 404.2, 414.2, 422.1, 456.1, 455/456.5, 456.6, 456.3
See application file for complete search history.

(56) References Cited

OTHER PUBLICATIONS

FCC: "FCC 18-4, Federal Communications Commission Second Report and Order and Second Order on Reconsideration in the Matter of Wireless Emergency Alerts and Amendments to Part 11 of the Commission's Rules Regarding the Emergency Alert System", Jan. 30, 2018 (Jan. 30, 2018), 60 Pages, XP055569253, Retrieved from the Internet: URL: https://docs.fcc.gov/public/attachments/FCC-18-4A1.pdf [retrieved on Mar. 14, 2019], Paragraphs [000I], [II.3], [III.A.1], [III.A.2].

International Search Report and Written Opinion—PCT/US2019/015750—ISA/EPO—dated Apr. 8, 2019.

* cited by examiner

METHODS AND SYSTEMS FOR EFFICIENT LOCATION SUPPORT FOR WIRELESS EMERGENCY ALERTS

CROSS-REFERENCE TO RELATED APPLICATIONS

This application claims the benefit of U.S. Provisional Application No. 62/628,304, filed Feb. 9, 2018, entitled "Methods and Systems for Efficient Location Support for Wireless Emergency Alerts," and U.S. Provisional Application No. 62/627,241, filed Feb. 7, 2018, entitled "Methods and Systems for Efficient Location Support for Wireless Emergency Alerts," the entire contents of which are hereby incorporated herein by reference for all purposes.

FIELD

The present disclosure relates generally to communication systems, and more particularly, to support of a wireless emergency alert (WEA) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). These multiple-access technologies have been adopted in various telecommunication standards to provide common protocols that enable different wireless devices to communicate on a municipal, national, regional, and even global level. The adoption of these protocols enables a wide range of services including Wireless Emergency Alert (WEA) systems. A WEA system typically enables public warning or alert messages to be broadcast from one or more wireless networks to all wireless devices currently accessing these wireless networks. Warning or alert messages can indicate the imminence or occurrence of various threats and hazards, both natural and man-made, such as earthquakes, wildfires, flooding, hurricanes, tornadoes, chemical spills, military attacks etc., and can indicate actions that citizens can or should take to protect themselves, their property and others. However, it may be necessary to deliver warning and alert messages only to users in affected areas and not to users elsewhere in order to reduce or avoid unnecessary panic and confusion and ensure that users in affected areas will treat warning and alert messages seriously. Methods and techniques to ensure that warning and alert messages are reliably, efficiently and quickly delivered to users in affected areas and not to users elsewhere may therefore be desirable.

SUMMARY

An example method, at a mobile device, for providing a warning message according to the disclosure includes receiving a warning message broadcast from a base station in a wireless network, the warning message including a message identifier and an interior or exterior cell indication and providing a content of the warning message to a user based on a detection of an interior cell indication.

Implementations of such a method may include one or more of the following features. The interior cell indication may include an indication of a cell for which location verification of the mobile device is not needed and the exterior cell indication may include an indication of a cell for which location verification of the mobile device is needed. The warning message may include a definition of a geographic area. The geographic area may be a polygon, circle, ellipse or other shape or shapes. The method may further include detecting the exterior cell indication in the warning message, determining a location estimate for the mobile device based on detecting the exterior cell indication, and determining whether the mobile device is within or outside the geographic area based on the location estimate. The method may further include determining that the mobile device is within the geographic area, and providing the content of the warning message to the user based on determining that the mobile device is within the geographic area. The warning message may further include an indication as to whether the mobile device shall or shall not provide the warning message to the user when unable to determine whether the mobile device is within or outside the geographic area, and may further include determining that the mobile device may or may not be within the geographic area, providing the content of the warning message to the user when the indication indicates that the mobile device shall provide the warning message, and not providing the content of the warning message to the user when the indication indicates that the mobile device shall not provide the warning message. Determining that the mobile device is within the geographic area may include at least one of determining that the location estimate is within the geographic area, determining that the location estimate is within a threshold distance of and outside the geographic area, or determining that the location estimate is either within the geographic area or within the threshold distance of and outside the geographic area. The warning message may include the threshold distance. The location estimate may include an error component, such that determining that the mobile device is within the geographic area comprises determining that the mobile device is within the geographic area with a threshold confidence. The method may further include determining that the mobile device is outside the geographic area, periodically reobtaining a new location estimate for the mobile device, and determining whether the mobile device has moved inside the geographic area based on the new location estimate. The method may further include determining that the mobile device has moved inside the geographic area, and providing the content of the warning message to the user based on determining that the mobile device has moved inside the geographic area. Periodically reobtaining the new location estimate may include reobtaining the new location estimate following an occurrence of a trigger event, where the trigger event may include at least one of an expiration of a periodic interval, a determination of a movement of the mobile device by more than a threshold distance from a previous location for the mobile device, receiving a new broadcast of the warning message, or receiving a new broadcast of the warning message after expiration of a threshold time interval following obtaining a previous location estimate for the mobile device. The method may also include ceasing to reobtain the new location estimate following at least one of an expiration of a maximum duration, ceasing to receive a broadcast of the warning message or performing a cell change or a handover to a new cell. The exterior cell indication may include an inclusion of the definition of the geographic area in the warning message and the interior cell indication may comprise an exclusion of the definition of the geographic area in the warning message. The message identifier may include the interior or exterior cell indication. The base station may be an evolved Node B (eNB), a next generation eNB (ng-eNB) or a New Radio Node B (gNB). The method may include verifying the warning message is not a duplicate, determining whether the user has opted out of receiving the warning message, and upon a determination that the user has not opted out of receiving the warning message, providing the content of the warning message to the user based on the detection of the interior cell indication.

An example of a device for receiving and displaying a warning message according to the disclosure includes a wireless transceiver configured to receive a warning message broadcast from a base station in a wireless network, at least one processor operably coupled to the wireless transceiver and configured to determine a message identifier and an interior or exterior cell indication based on the warning message, and provide a content of the warning message to a user based on a detection of the interior cell indication.

Implementations of such a device may include one or more of the following features. The interior cell indication may include an indication of a cell for which location verification of the mobile device is not needed and the exterior cell indication may include an indication of a cell for which location verification of the mobile device is needed. The warning message may include a definition of a geographic area and the at least one processor may be configured to determine the geographic area based on the warning message. The geographic area may be a polygon, circle, ellipse, or other shape or shapes. The at least one processor may be further configured to determine the exterior cell indication based on the warning message, determine a location estimate for the device based on detecting the exterior cell indication, and determine whether the device is within or outside the geographic area based on the location estimate. The at least one processor may be further configured to determine that the device is within the geographic area and provide the content of the warning message to the user based on determining that the mobile device is within the geographic area. The at least one processor may be further configured to determine whether the mobile device shall or shall not provide the warning message to the user when unable to determine whether the mobile device is within or outside the geographic area based on the warning message, determine that the mobile device may or may not be within the geographic area, provide the content of the warning message to the user when an indication indicates that the mobile device shall provide the warning message, and not provide the content of the warning message to the user when the indication indicates that the mobile device shall not provide the warning message. The at least one processor may be configured to determine that the mobile device is within the geographic area by at least one of determining that the location estimate is within the geographic area, determining that the location estimate is within a threshold distance of and outside the geographic area, or determining that the location estimate is either within the geographic area or within the threshold distance of and outside the geographic area. The at least one processor may be configured to determine the threshold distance based on the warning message. The at least one processor may be further configured to determine whether the user has opted out of receiving the warning message; and upon a determination that the user has not opted out of receiving the warning message, provide the content of the warning message to the user based on the detection of the interior cell indication.

An example of an apparatus for providing a warning message according to the disclosure includes means for receiving a warning message broadcast from a base station in a wireless network, the warning message including a message identifier and an interior or exterior cell indication and means for providing a content of the warning message to a user based on a detection of the interior cell indication.

An example of a method, at a first network node for a wireless network, for providing warning messages to mobile devices served by the wireless network according to the disclosure includes receiving an alert message from a gateway node, the alert message including at least one message parameter, where the at least one message parameter includes a definition of a target geographic area, determining a plurality of cells for the wireless network based on the target geographic area, partitioning the plurality of cells into a subset of interior cells and a subset of exterior cells based on a coverage area for each cell in the plurality of cells, and sending a first warning message to a second network node for the wireless network, the first warning message based on the alert message, the first warning message including an identification of each cell in the subset of interior cells, and sending a second warning message to the second network node for the wireless network, the second warning message based on the alert message, the second warning message including the definition of the target geographic area and an identification of each cell in the subset of exterior cells.

Implementations of such a method may include one or more of the following features. The second network node may forward the first warning message to a first plurality of base stations associated with the subset of interior cells and may forward the second warning message to a second plurality base stations associated with the subset of exterior cells, such that the first plurality of base stations broadcast the first warning message in each cell in the subset of interior cells and the second plurality of base stations broadcast the second warning message in each cell in the subset of exterior cells. Determining the plurality of cells may include determining cells for the wireless network with cell coverage areas overlapping the target geographic area. Partitioning the plurality of cells may include assigning each cell in the plurality of cells to the subset of interior cells when and only when the coverage area of the each cell is wholly within the target geographic area or partially within the target geographic area and not extending by more than a threshold distance outside of the target geographic area. The coverage area of the each cell may be a normal coverage area or an extended coverage area. The threshold distance may be zero. The first warning message and the second warning message may be the same warning message, such that the identification of each cell in the subset of interior cells may include an indication of an interior cell, where the identification of each cell in the subset of exterior cells may include an indication of an exterior cell. The first warning message may include a first message identifier and the second warning message may include a second message identifier, such that the first message identifier and second message identifiers are based on the at least one message parameter and are different. The target geographic area may be a polygon, circle or ellipse. The first network node may be a Cell Broadcast Center (CBC) and the second network node may be a Mobility Management Entity (MME) or an Access and Mobility Management Function (AMF).

An example of a method, at a base station for a wireless network, for providing a warning message to a mobile device according to the disclosure includes receiving a first warning message from a network node for the wireless network, the first warning message comprising an identification of at least one cell for the base station and a first indication of whether the at least one cell is an interior or an exterior cell, and broadcasting a second warning message in the at least one cell, the second warning message based on the first warning message, the second warning message including a second indication of whether the at least one cell is an interior or an exterior cell, the second indication based on the first indication.

Implementations of such a method may include one or more of the following features. The first indication and the second indication may be both indications of an interior cell or both indications of an exterior cell. The first warning message may include a definition of a target geographic area and the definition of the target geographic area may be included in the second warning message when the first indication is an indication of an exterior cell. The definition of the target geographic area in the second warning message may be excluded when the first indication is an indication of an interior cell. The second indication may include or exclude the definition of the target geographic area in the second warning message. The network node may be an Access and Mobility Management Function (AMF) and the base station may be a next generation evolved Node B (ng-eNB) or a New Radio Node B (gNB). The network node may be a Mobility Management Entity (MME) and the base station may be an evolved Node B (eNB).

BRIEF DESCRIPTION OF THE DRAWINGS

Like reference symbols in the various drawings indicate like elements, in accordance with certain example implementations.

DETAILED DESCRIPTION

Figure 1:
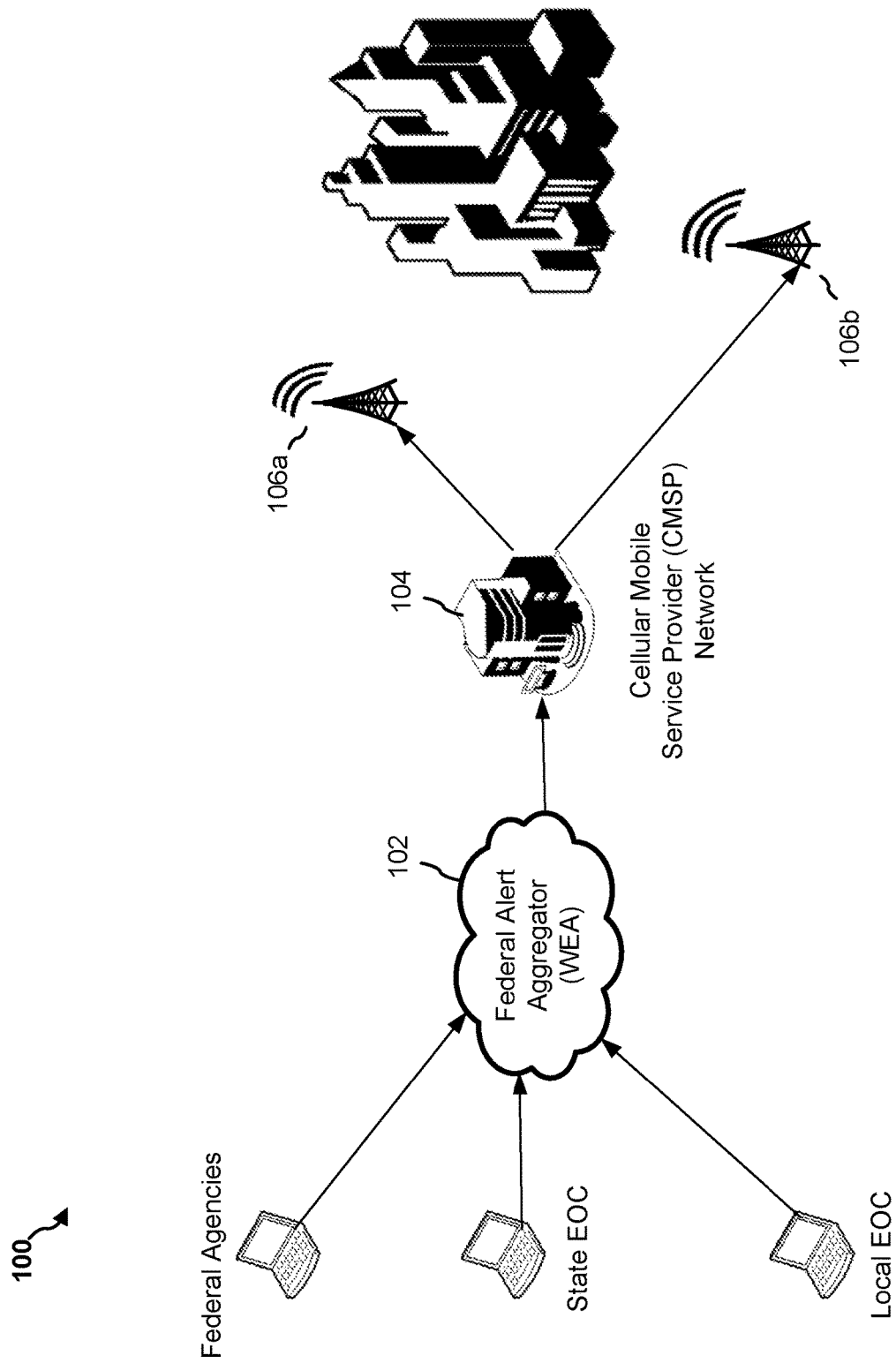
FIG. 1 is a diagram of an example of a WEA system.

Techniques are discussed herein for providing wireless emergency alerts to a user of a mobile device. For example, emergency information including an indication of an impacted area may be provided to a cellular mobile service provider (CMSP) network by a local or national government agency and a warning message may be subsequently broadcast by base stations in the CMSP network to mobile devices in the impacted area. Each mobile device may then display the warning message to a user of the mobile device or may otherwise alert the user in some way (e.g. via an audible signal) to the presence of the warning message. These techniques are examples only, and not exhaustive.

Items and/or techniques described herein may provide one or more of the following capabilities, as well as other capabilities not mentioned. An "alert message", also referred to as a "warning message", may be provided by an emergency management entity and received by a CMSP. The alert message may include an impact area. The CMSP may determine the coverage area of network transmission areas that are completely within the impacted area. A network transmission area with a coverage area that is totally within the impacted area may be classified as an interior transmission area. A network transmission area with a coverage area that is both within the impacted area and outside of the coverage area may be classified as an exterior transmission area. The alert message including the impact area may be broadcast to mobile devices in the CMSP network. An indication of the interior or exterior classification may be included in the alert message or inferred by other data in the alert message. Mobile devices receiving the alert message in association with an interior transmission area may display the alert message without determining a current location of the mobile device. Mobile devices receiving the alert message in association with an exterior transmission area may determine a current location and display the alert message if and only if the mobile device is located within the impact area. Typically, a transmission area may correspond to an individual cell or cell sector in a CMSP network, in which case an interior transmission area may be referred to as an "interior cell" and an exterior transmission area may be referred to as an "exterior cell". However, other types of transmission area are possible such as a collection of cells (e.g. a Tracking Area in the case of LTE or NR coverage or an emergency area), a non-cellular coverage area of a short range access point or beacon (e.g. for WiFi (also referred to as Wi-Fi) or Bluetooth®), a coverage area for FM radio transmission, etc. In such other cases, the terms "interior tracking area", "interior emergency area", "exterior tracking area" and "exterior emergency area" may be used corresponding to an interior transmission area or exterior transmission area.

Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

It is noted that the terms "interior transmission area" and "exterior transmission area" and their significance may be described and conveyed to a mobile device in different manners. For example, in one implementation, a warning message may include a parameter or flag that indicates whether the warning message is for an interior transmission area or exterior transmission area. The mobile device may then display the warning message without determining a current location if an interior transmission area is indicated or may display the warning message if and only if the mobile device is verified to be located within the impact area if an exterior transmission area is indicated. However, in another implementation, the warning message may include an indication of whether the mobile device either does (case A) or does not (case B) need to obtain a current location and verify the mobile device is located in an impact area for the warning message. The mobile device may then display the warning message without determining a current location of the mobile device for case B or display the alert message if and only if the mobile device verifies being located within the impact area for case A. The behavior of the mobile device in both implementations is identical and only the manner of describing a transmission area and conveying this description to a mobile device may differ. As an example, the terms "interior transmission area" and "exterior transmission area" may be replaced by equivalent definitions, such as "transmission area for which UE location verification is not needed" and "transmission area for which UE location verification is needed", respectively, which may then be conveyed to a mobile device.

Referring to FIG. 1, a diagram of an example WEA system 100 is shown. The WEA system 100 is configured to utilize radio frequency broadcast technology to provide geographically-targeted and timely alert messages to mobile devices. An alert message is a message that is intended to provide the recipient information regarding an emergency and that meets the requirements of regional regulations. For example, the WEA system 100 may generate and provide alert messages to notify users about a geographically specific emergency such as an earthquake, a tsunami, a flood, a tornado, a wildfire, an act of terrorism, a child abduction (e.g., an AMBER alert), a possible nuclear missile attack, local riots, or other types of emergency events.

In many countries, commercial mobile service providers (CMSPs) 104 (sometimes referred to herein as "providers") are required to transmit alert messages which comply with agreed upon standards, protocols, and/or procedures. As an example, standards, protocols, and/or procedures applicable to WEA support in the United States may be provided by the Alliance for Telecommunications Industry Solutions (ATIS), Telecommunications Industry Association (TIA), and/or joint ATIS/TIA groups. An example of a related standard is Joint ATIS/TIA Commercial Mobile Alert System (CMAS) Federal Alert Gateway to CMSP Gateway Interface Specification (J-STD-101). The alert message processes controlled by a CMSP 104 may also be required to comply with local and/or federal government regulations (e.g., regulations adopted by the U.S. Federal Communications Commission (FCC) and State or County emergency preparedness procedures). Government collaboration with the WEA system is provided by the FCC, Federal Emergency Management Agency (FEMA), and Department of Homeland Security (DHS).

In operation, alert messages may originate from federal agencies, local emergency operations centers (EOCs), and state EOCs. Alert messages may also originate from other sources not illustrated in FIG. 1. An alert message may be triggered by various types of emergencies, such as an earthquake, a tsunami, a flood, a tornado, a wildfire, an act of terrorism, acts of war, civil unrest, and/or child abduction (e.g., an AMBER alert). Alert messages originating from various sources (e.g., federal agencies, local EOCs, and state EOCs) may be provided to an alert aggregator 102. In some configurations, the alert aggregator 102 may authenticate the alert messages. Authentication may involve checking the authenticity of the alert message to confirm that the alert message was transmitted by an authorized source in order to prevent unauthorized sources (e.g., terrorist, hackers, hostile foreign states, etc.) from causing fraudulent alert messages to be disseminated to mobile devices using the WEA system 100. The alert aggregator 102 may provide the alert messages to the CMSP 104 (and possibly to other CMSPs not shown in FIG. 1), which is prepared to transmit alert messages to mobile devices accessing CMSP 104 via one or more network transmitters 106a-b (e.g. which may include cellular base stations and possibly other transmitters such as WiFi access points). In some configurations, the alert aggregator 102 may be administered by a governmental entity (e.g., a federal, state, local agencies).

The CMSP 104 may include one or more systems and/or personnel to determine or verify the severity of an emergency (referred to as "severity information") as well as a geographic area associated with the emergency, which may also be provided by the alert aggregator 102. This geographic area may be referred to as the impacted area, impact area, target area or target geographic area, these terms being used synonymously herein. For example, one or more systems and personnel in the CMSP 104 may verify that a notification received from the aggregator 102 regarding a potential tornado touch down has a high severity, and that the corresponding impacted area (e.g., the predicted tornado touch down area) includes areas covered by the CMSP 104 network resources such as the transmitters 106a-b. The provider may utilize various components of the CMSP 104 network to generate and transmit an alert message to mobile devices within the target geographic area (or within a portion of the target geographic area served by CMSP 104). In an example, the WEA system 100 may utilize broadcast technology such that one or more alert messages may be provided simultaneously to all mobile devices in the target geographic area.

Figure 2A:
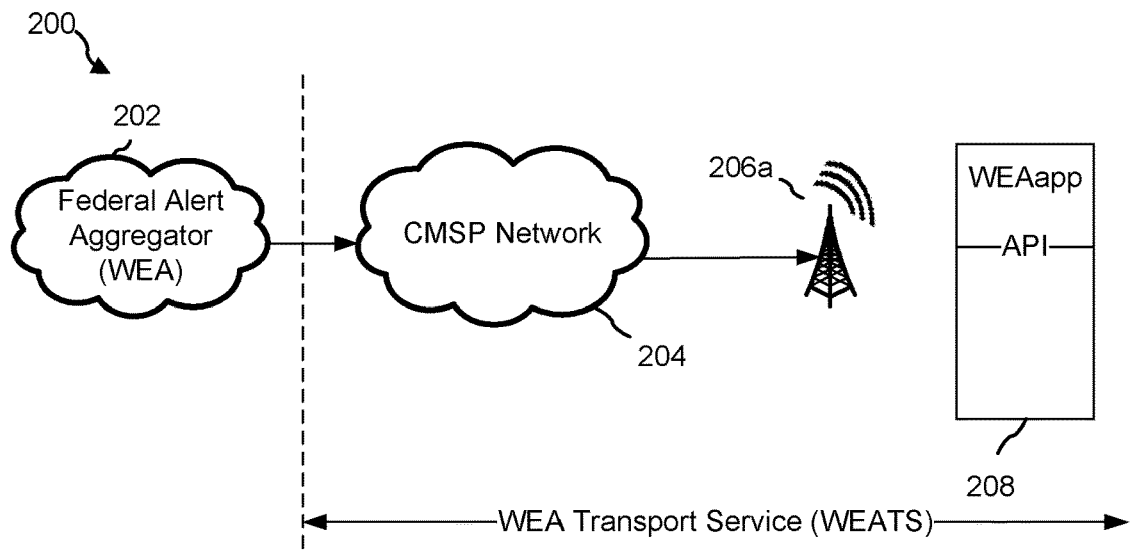
FIG. 2A is a diagram of an example alert message flow using a WEA Transport Service.

Referring to FIG. 2A, with further reference to FIG. 1, an example of an alert message flow using a WEA transport service 200 is shown. A federal alert aggregator 202 (e.g. corresponding to alert aggregator 102 in FIG. 1) is configured to receive alert information from verified sources such as federal agencies, and state/local EOCs (not shown in FIG. 2A). The alert information is then provided to a CMSP network 204 (e.g. corresponding to CMSP network 104 in FIG. 1). The CMSP network 204 is configured to generate alert messages including geographic boundaries and broadcast the alert messages to one or more mobile devices 208 via one or more transmitters 206a (e.g. corresponding to transmitters 106a-b in FIG. 1). As used herein, the term mobile device may include a User Equipment (UE) such as a cellular phone, a smart phone, a session initiation protocol (SIP) phone, a laptop, a personal digital assistant (PDA), a satellite radio, a tracking device, a multimedia device, a video device, a digital audio player (e.g., MP3 player), a camera, a game console, a tablet, an Internet of Things (IoT) device, a wearable device (e.g., smart watch) or any other similar functioning device. A mobile device may also be referred to by those skilled in the art as a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2B:
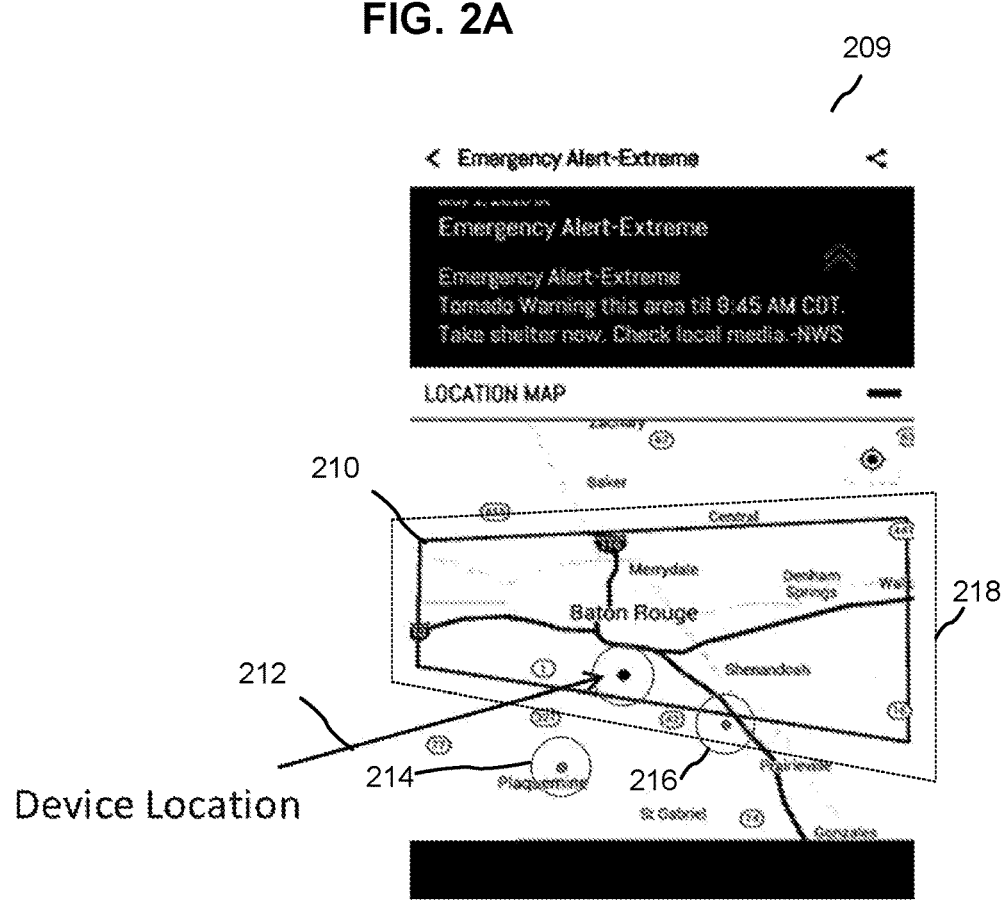
FIG. 2B shows an example user interface displaying an emergency alert.

In an example, the CMSP network 204 and transmitter 206a may be a Long-Term Evolution (LTE) wireless network, as defined by the Third Generation Partnership Project (3GPP), and the alert messages may be broadcast using one or more LTE System Information Blocks (e.g., a SIB12). The alert message may include an indication of an impacted area such as a target geographic area defined by a polygon, circle, ellipse, or some other shape (or shapes). The mobile device 208 may include a software application (e.g., WEAapp) configured to parse and process the information contained in the alert message. For example, referring to FIG. 2B, the mobile device 208 may execute the WEAapp to display an alert message 209. The alert message 209 may include (in this example) a polygon area 210 representing a geographic boundary line of the impacted area included in the alert message. In an embodiment, the process of displaying the alert message on the mobile device 208 may be based on the current location of the mobile device. For example, if the mobile device 208 is located in a first position 212 that is within the polygon area 210, then the mobile device 208 will display the alert message 209. Conversely, if the mobile device 208 is located in a second position 214 which is outside the polygon area 210, the alert message may not be displayed. In an example, a boundary area 218, also referred to as a "border area" 218, outside of and surrounding the polygon area 210 may be defined. The boundary area 218 may extend the polygon area 210 outward by a predetermined value (e.g., by outwardly extending the boundary of the impact area by 0.1, 0.2 or 0.5 miles in one, some, or all directions). A mobile device apparently located at a third position 216 that is outside the polygon area 210 but within the boundary area 218 may optionally display an alert message based on other factors such as the severity of the emergency, user preferences, CMSP preferences, and/or an uncertainty of the position of the mobile device.

A location estimate for a mobile device may typically contain an unknown error component which may arise due to location measurement errors and/or errors in data used to compute a location estimate from location measurements such as errors in the locations of radio sources (e.g. base stations and/or navigation satellites) used to obtain the location measurements. Consequently, the third position 216 which is outside the polygon area 210 by a small distance (e.g. as limited by the boundary area 218) may be for a mobile device which is inside the polygon area 210 due to an error in the third position 216. Although the third position 216 may still be outside the polygon area 210 in certain cases, it may be seen as more important (e.g. by government authorities and regulators) to provide an alert message to a user rather than not provide the alert message when the presence or absence of the use in the target polygon area 210 cannot be reliably determined.

Figure 3:
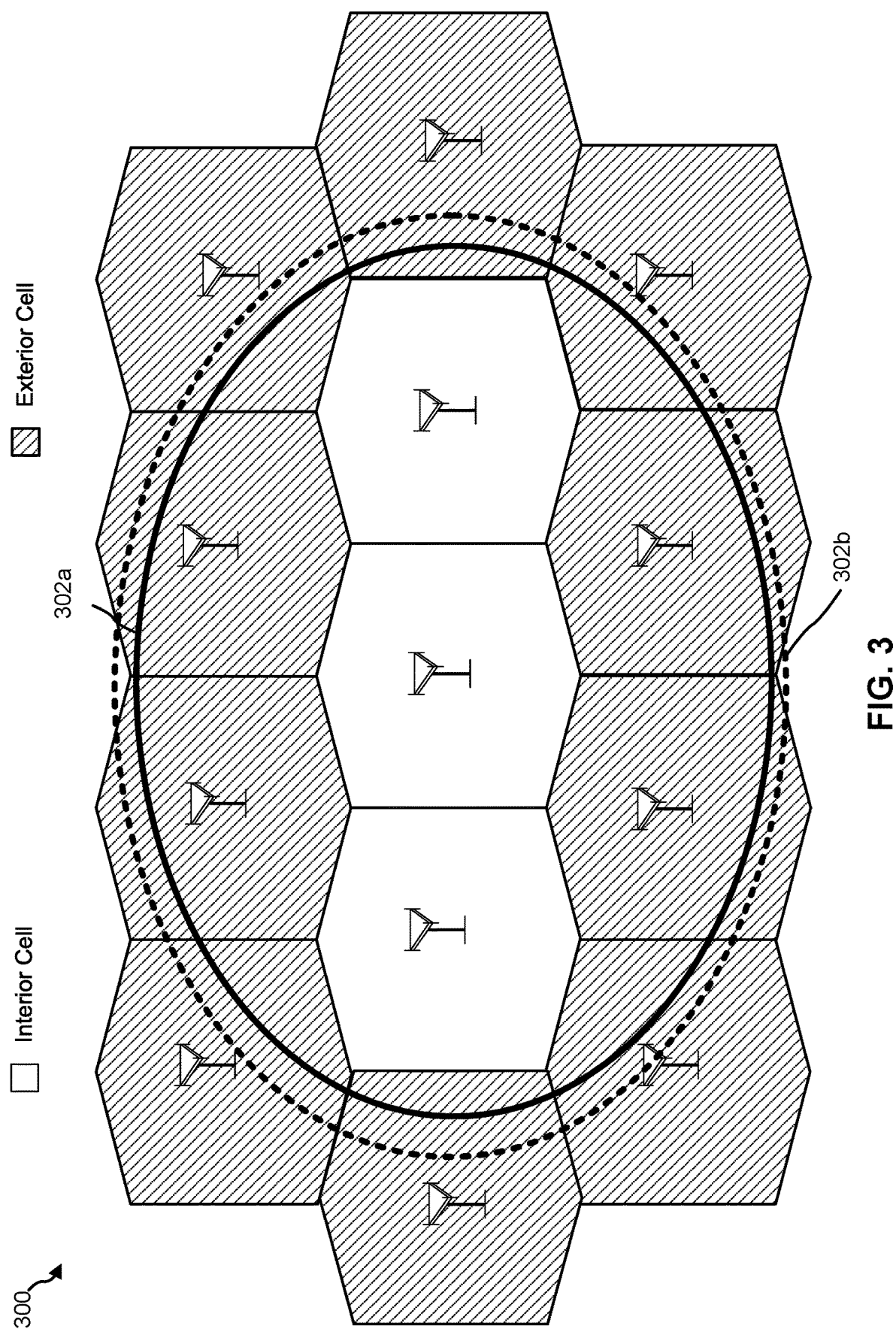
FIG. 3 is a diagram illustrating examples of interior cells and exterior cells for a warning or alert message.

In a large network with many mobile devices, utilizing the positioning capabilities of each of the mobile devices may result in extensive positioning operations and a corresponding increased level of network overhead and/or mobile device overhead caused by positioning messages, positioning measurements and/or positioning computation. Specifically, during an emergency event, many mobile devices within a geographic area may be simultaneously transmitting and receiving positioning messages to help determine whether a received alert message should be displayed. This increase in messaging may require extensive support by networks. In the extreme, a sudden increase in the positioning messages may overwhelm a network. The increased messaging and processing load on the network (and mobile devices) may also increase errors in positioning due to fewer network resources being available to position each mobile device. Because of the inaccurate position estimates, a mobile device may incorrectly determine it is located either outside of or inside the target polygon shape and the border area. In addition to these consequences, there may be added delay in providing alert messages to users. Accordingly, the embodiments described herein may mitigate or avoid these issues by reducing the number of positioning message transmissions and/or positioning operations in a network and/or mobile device and/or may facilitate prompt delivery of alert messages Another wireless emergency alert solution may rely on a network operator being able to determine interior cells and exterior cells for any target area prior to broadcasting an emergency message. Referring to FIG. 3, an example of an access network 300 including interior and exterior cells is shown. The coverage area of the access network 300 is divided into a number of cellular regions (cells) which are each served by at least one base station. Each base station includes one or more transceivers configured to communicate with mobile devices located in cells supported by the base station. In an example, the wireless network 300 is an LTE radio access network and the base stations are evolved Node B (eNodeB, eNB) network elements. Other network configurations and elements may also be used such as a New Radio (NR) radio access network, also referred to as a Fifth Generation (5G) network, which may use base stations referred to as an NR Node B (gNB). A base station may support one or multiple (e.g., three) cells (also referred to as a cell sectors). The term "cell" can refer to the smallest coverage area of a base station and/or a base station subsystem serving a particular coverage area. Further, the terms "base station," "eNB," "next generation eNB" (ng-eNB), "gNB" and "cell" may be used interchangeably herein.

In FIG. 3, an impacted area represented by an elliptical shape 302a is overlaid on the coverage area of the access network 300. A corresponding border area 302b (represented with a dashed-line) represents an extension of the impact area by a predetermined amount (e.g., by outwardly extending the boundary of the impact area 0.1, 0.2, 0.5 miles, etc. in one, some, or all directions). The impact area and the extension to the impact area may be established by the provider and included in a warning message. Alternatively, or in addition, the extension to the impact area may be configured within each mobile device. Relative to the location of the elliptical shape 302a, an interior cell (indicated with a plain background in FIG. 3) may be any cell with a wireless coverage area that is totally included within the polygon shape 302a and the border area 302b. In an LTE radio access network, this means that any mobile device able to receive a warning message (e.g. via a SIB12 broadcast) from an interior cell would either be inside the target polygon shape 302a or inside the border area 302b. Exterior cells (indicated with a hatched background in FIG. 3) may comprise all other cells with coverage areas that overlap partially with the target polygon area 302a but also include areas outside the target polygon area 302a and the border area 302b. Continuing the LTE example, an eNB may be configured to broadcast WEA messages including an indication for each cell as to whether the cell is an interior cell or an exterior cell. Such an indication may be a simple Boolean flag or other variable. In an example, the indication as to whether the cell is an interior cell or an exterior cell may be represented by the presence or absence of a definition of the target elliptical area 302a (e.g., where the definition would be present for an exterior cell and absent for an interior cell). A mobile device which receives a WEA message for an exterior cell may be configured to determine its location and verify whether the location is inside the target polygon area 302a or border area 302b and then display or not display the WEA message as required. Conversely, a mobile device which receives a WEA message for an interior cell may be configured to display or otherwise indicate the WEA message to the user without obtaining a location of the mobile device or without attempting to determine whether the mobile device is or is not inside the target polygon area.

The identification of an interior cell may be used to reduce the delay and messaging overhead used to obtain a mobile device location, which was required in the previous example to verify that the mobile device is located in an impacted area. The identification of an interior cell may also reduce or avoid positioning errors which could otherwise result in failing to provide the alert message to a user because the position of the mobile device is mistakenly determined to be outside of the impacted area. The reduction in positioning requirements within the interior cells may result in lower resource usage, lower latency and higher reliability of providing alert messages for mobile devices served by the interior cells. These improvements may improve the overall statistical performance of WEA for all cells in an impacted area.

Figure 4:
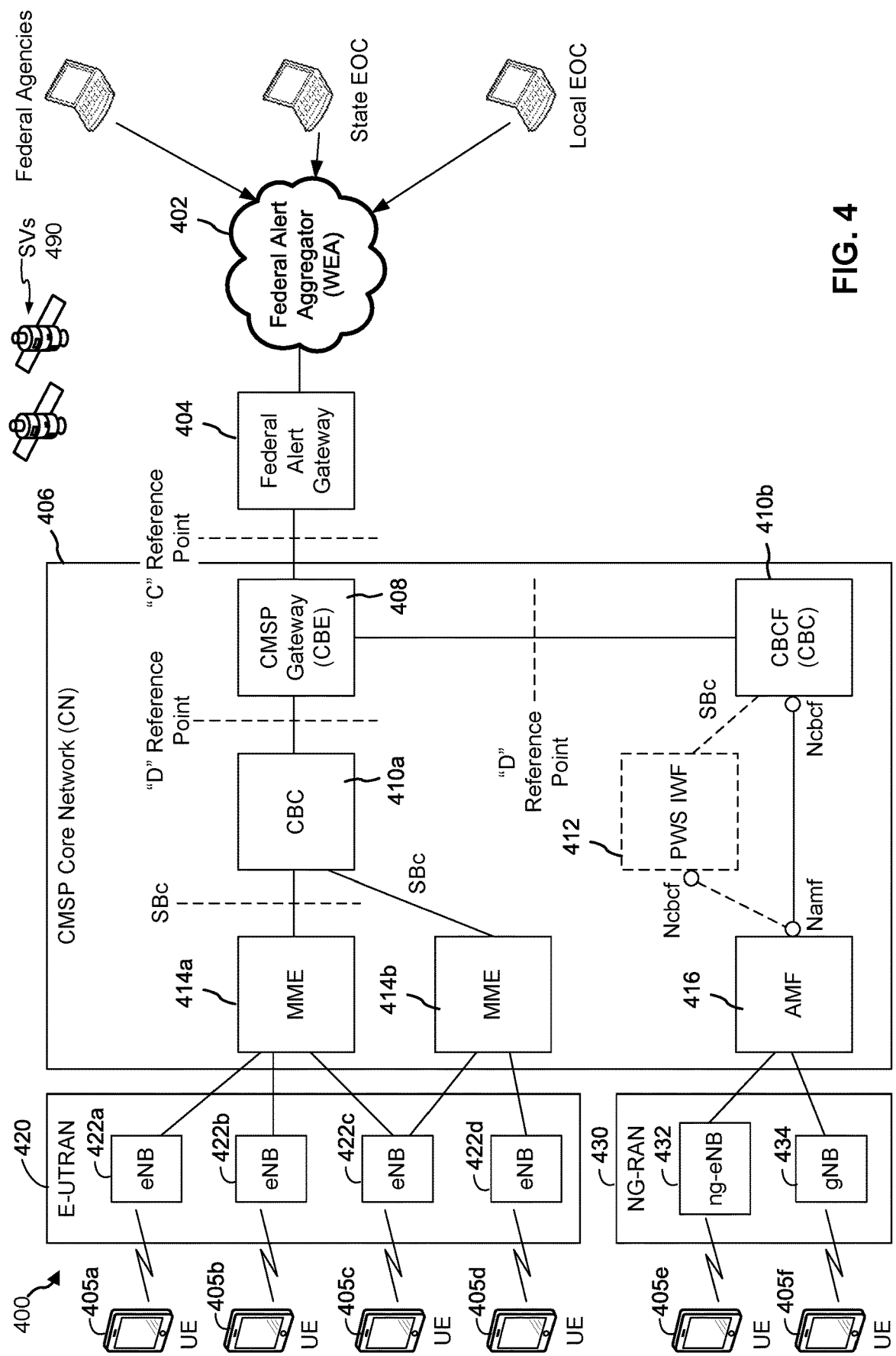
FIG. 4 is a diagram of an example network architecture for providing wireless emergency alerts.

Referring to FIG. 4, an example network architecture 400 for providing wireless emergency alerts is shown. Alert messages originating from various sources (e.g., federal agencies, local EOCs, and state EOCs) are provided to an alert aggregator 402 (e.g. corresponding to alert aggregator 102 in FIG. 1 and alert aggregator 202 in FIG. 2A) for dissemination to network providers. In an example, the alert aggregator 402 may provide the alerts to a federal alert gateway 404 configured to authenticate the alert messages to prevent fraudulent alerts from being broadcast by a WEA system.

A CMSP core network (CN) 406 (e.g. corresponding to CMSP network 104 in FIG. 1 and CMSP network 204 in FIG. 2A) receives alerts including impact area information from the federal gateway 404. While the CMSP core network 406 as depicted in FIG. 4 includes elements associated with LTE and 5G networks, the disclosure is not so limited. The functionality described herein may be applied to other wireless network technologies. CMSP core network 406 includes a CMSP gateway 408 configured to verify and reformat incoming messages and distribute the messages to one or more cell broadcast centers (CBCs). CMSP gateway 408 may also be referred to as Cell Broadcast Entity (CBE). A CBC 410a may be used in an LTE architecture and a CBC Function (CBCF) 410b may be used to in a 5G architecture. The CBC 410a and the CBCF 410b (collectively referred to as CBCs 410) are configured to retain information to identify tracking areas, emergency areas, and/or cell ID lists for an alert until the alert is canceled or the alert expires. The CBCs 410 may determine the network elements for a WEA alert to include in a broadcast. The CBCs 410 may pass alert messages to one or more Mobility Management Entities (MME) 414a-b via a SBc interface. In one variant, the CBCF 410b may pass an alert message directly to an Access and Mobility management Function (AMF) 416 using a service based interface. In another example, an alert message may be transferred by CBCF 410b to a Public Warning System interworking function (PWS IWF) 412 using an SBc interface; the PWS IWF 412 may then perform protocol translation and transfer the alert message to AMF 416 using a service based interface.

It is noted that network architecture 400 assumes that CMSP CN 406 supports wireless access using both LTE and NR. In a CMSP CN supporting only LTE wireless access, NG-RAN 430, AMF 416, PWS IDF 412 and CBCF 410b may be absent. Similarly, in a CMSP CN supporting only NR wireless access (or LTE wireless access via NG-RAN 130 but not via an E-UTRAN), E-UTRAN 420, MMEs 414a and 414b, and CBC 410a may be absent.

In general, the role of the CBCs 410 (e.g. CBC 410a and CBCF 410b) is to decide in which cells (or in which tracking areas or emergency areas which may map to cells) an alert message needs to be broadcast based on the impact area. The CBCs 410 receive a description or definition of the impact area along with the alert message and a required frequency and duration of transmission for the alert message from the CMSP gateway 408 which in turn receives at least the description or definition of the impact area and the alert message from Federal alert gateway 404. The impact area may be defined as a polygon, ellipse, circle or some other 2-dimensional (or 3-dimensional) shape as exemplified previously. One role of the CBCs 410 may be to determine the wireless cells (or possibly the tracking areas or emergency areas), for radio access networks (RANs) attached to CMSP CN 406, which are within or at least partly within the impact area (e.g. as illustrated with respect to FIG. 3). The CBCs 410 may also determine a corresponding interior-exterior classification for each cell (or each tracking area or emergency area) based on the methods described herein. The CBCs 410 determine a list of cells (or tracking areas or emergency areas) and an interior or exterior classification for each cell (or each tracking area or emergency area), and send the alert message to one or more MMEs 414a-b and/or one or more AMFs 416 along with the list of cells (or tracking areas or emergency areas) and the corresponding interior/exterior classifications.

In an embodiment, a CBC 410 may only transfer to an MME 414 or AMF 416, a list of cells (or tracking areas or emergency areas) which can be accessed from base stations connected to or reachable from the MME 414 or AMF 416. For example, a CBC 410 may partition a complete list of cells corresponding to the target area into different non-overlapping subsets of cells, where each subset of cells is transferred along with the alert message and interior/exterior classifications for this subset of cells to a different MME 414 or AMF 416. A CBC 410 may also transfer to each MME 414 and AMF 416 an indication of one or more tracking areas in which the alert message needs to be broadcast which may be used by an MME 414 or AMF 416 to determine base stations (e.g. eNBs 422, ng-eNBs 432 and/or gNBs 434) to which the alert message should be transferred for possible broadcast.

The MMEs 414 and AMF 416 may normally support network access and registration by UEs 105, mobility of UEs 405, including cell change and handover and may participate in supporting a signaling connection to a UE 405 and possibly data and voice bearers for a UE 405. The role of MMEs 414 for the method described herein may be to transfer an alert message along with a list of cells and the interior/exterior classifications to one or more of eNBs 422a-d in an Evolved Universal Mobile Telecommunications System (UMTS) Terrestrial Radio Access (E-UTRAN) 420, as determined using the indication of the one or more tracking areas provided by CBC 410a as described above. AMF 416 may perform a corresponding role with respect to transferring the alert message along with a list of cells and the interior/exterior classifications to one or more of gNBs 434 and/or ng-eNBs 432 in a Next Generation RAN (NG-RAN) 430, as determined using the indication of the one or more tracking areas provided by CBCF 410b. Here, and for normal operation, gNB 434 may support wireless access using NR by a UE 405f; ng-eNB 432 may support wireless access using LTE for a UE 405e (but with communication passing through AMF 416 rather than an MME 414) and eNBs 422a-d may support wireless access using LTE by UEs 405a-d. With regard to the method described here, the base stations, comprising the eNBs 422a-d, ng-eNB 432 and gNB 434 broadcast the alert message (e.g. using a SIB12) to UEs 405 in their respective coverage areas, including the interior-exterior classification and (e.g. for an exterior classification) the target area shape. The broadcast may occur in each cell that is indicated to a base station in association with the alert message by an MME 414 or AMF 416.

In an example, a CBC 410 (e.g. CBC 410a or CBCF 410b) may be configured to determine whether a cell that is at least partly within the target area is an interior or exterior cell and then include a flag (e.g., a Boolean or other variable type) associated with each cell to indicate the classification. The flag can be interpreted by the base stations to indicate when each base station broadcasts the alert message whether the broadcast is for an interior or exterior cell. In another example, the indication of the interior-exterior classification may be conveyed by the inclusion or exclusion of a definition for the target area (e.g. such as the coordinates of the vertices for a polygon or the coordinates of the center and length of a radius for a circle) in the alert message. For example, inclusion of the definition may indicate an exterior cell and exclusion of the definition may indicate an interior cell.

In another embodiment, referred to here as embodiment E1, a CBC 410 may be configured to send two alert messages to an MME 414 or AMF 416 containing different message identifiers. A first alert message may be broadcast only in interior cells and may therefore be accompanied by a list of only the interior cells and may be transferred by a CBC 410 only to MMEs 414, AMFs 416 and (subsequently) to base stations (e.g. eNBs 422, ng-eNBs 432 and gNBs 434) which are associated with the list of interior cells. A definition of the target area may not be provided for the first alert message by a CBC 410 when transferring the first alert message to an MME 414 or AMF 416. A base station (e.g. eNB 422, ng-eNBs 432 or gNB 434) may therefore broadcast the first alert message without including a definition of the target area. A UE 405 that receives a broadcast of the first alert message may therefore always provide the alert message to a user, for example based on the absence of a definition for the target area or based on a distinct message identifier for the first alert message. A second alert message may be broadcast only in exterior cells and may therefore be accompanied by a list of only the exterior cells and may be transferred by a CBC 410 only to MMEs 414, AMFs 416 and (subsequently) to base stations (e.g. eNBs 422, ng-eNBs 432 and gNBs 434) which are associated with the list of exterior cells. A definition of the target area may be provided for the second alert message by a CBC 410 when transferring the second alert message to an MME 414 or AMF 416. A base station (e.g. eNB 422, ng-eNB 432 or gNB 434) may therefore broadcast the second alert message with a definition of the target area. A UE 405 that receives a broadcast of the second alert message may therefore only provide the alert message to a user if the location of the UE 405 is within the target area or a boundary around the target area, for example based on the presence of a definition for the target area or based on a distinct message identifier for the second alert message. In this example, both the first and second alert messages may be messages defined to be broadcast only to a UE 405 that supports an ability to determine whether the UE 405 is in a target area, in which case the message identifiers for both the first and second alert messages may be new message identifiers which are not used in alert messages broadcast to a UE 405 that does not support an ability to determine whether the UE 405 is in a target area. Alternatively, in this example, the first alert message may be a legacy alert message containing a legacy message identifier which can be broadcast to a UE 405 that does not support an ability to determine whether the UE 405 is in a target area, and only the second alert message may contain a new message identifier and be broadcast to a UE 405 that supports an ability to determine whether the UE 405 is in a target area. In this alternative, the exterior versus interior cell classification may be conveyed by the message identifier and/or by the presence versus absence, respectively, of a definition of the target area for an alert message. Furthermore, in this alternative, the first alert message may need to be broadcast in both interior and exterior cells if some recipient UEs 405 are legacy UEs that do not support an ability to determine whether the UE 405 is in a target area; a UE 405 that receives such a first alert message in a cell may then need to determine whether the second alert message is also broadcast in the cell in order to determine whether the cell is an interior or exterior cell. Embodiment E1 may be capable of support by a base station without any new impact, so long as the base station already supports the conveyance and broadcast of a target area for a broadcast alert message, which may reduce overall implementation impact.

In another example, a parameter or parameters in a SIB12 message may be used to indicate an interior-exterior classification for a cell. For example, an interior-exterior classification for a cell may be indicated by the presence or absence of a flag, a false versus true value for a Boolean parameter, the presence or absence of a parameter conveying a definition of a target area for the alert message, or the value of a message identifier for an alert message.

Network architecture 400 may be associated with or have access to satellite vehicles (SVs) 490 for a Global Navigation Satellite System (GNSS) like GPS, GLONASS, Galileo or Beidou or some other local or regional Satellite Positioning System (SPS) such as IRNSS, EGNOS or WAAS. UEs 405 may obtain location measurements for signals transmitted by SVs 490 and/or by base stations and access points such as eNBs 422, ng-eNB 432 and/or gNB 434 which may enable a UE 405 to determine a location estimate for UE 405 or to obtain a location estimate for UE 405 from a location server in CMSP CN 406. For example, UE 405 may transfer location measurements to the location server to compute and return the location estimate. UEs 405 (or a location server in CMSP CN 406) may obtain a location estimate for UE 405 using position methods such as GPS, Assisted GPS (A-GPS), Assisted GNSS (A-GNSS), Observed Time Difference of Arrival (OTDOA), Enhanced Cell ID (ECID), Wireless Local Area Network (WLAN) positioning (e.g. using signals transmitted by IEEE 802.11 WiFi access points), sensors (e.g. inertial sensors) in UE 105, or some (hybrid) combination of these. A UE 405 may use a location estimate for the UE 405 to determine or help determine whether the UE 405 is in an impact area for a broadcast alert message as described elsewhere herein.

Figure 5:
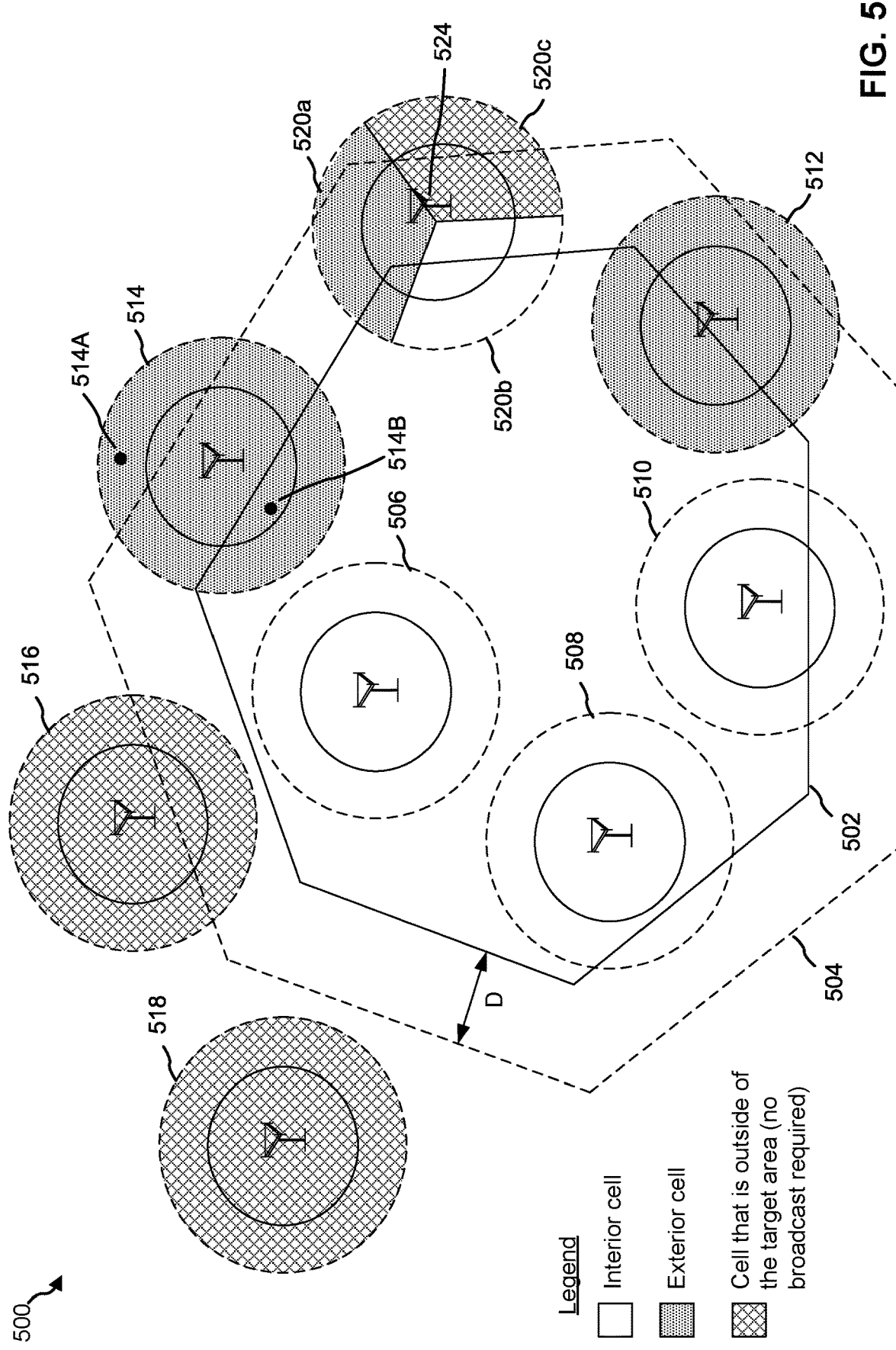
FIG. 5 is a diagram illustrating further examples of interior and exterior cells for a warning or alert message.

FIG. 5 shows a geographic area 500 served by a wireless network (e.g. using NG-RAN 130 and/or E-UTRAN 120 in FIG. 4) including examples of interior and exterior cells for a target area with a polygon shape. The geographic area 500 includes an example target area 502 that is a polygon (solid line) and a border area 504 (dashed line) surrounding the target area 502. The distance 'D' between the perimeter of the target area 502 and the perimeter of the border area 504 may be assigned as a static standard value or dynamically associated with a particular alert message or target area. The length of 'D' may vary but may typically be a value less than or equal to one mile. The geographic area 500 includes a plurality of cells 506-520. A normal coverage area for each cell is outlined with a solid line, and an extended coverage area for each of the cells is illustrated with a dashed line. A normal coverage area may typically be used by a UE to obtain service from a wireless network via transmission and reception of wireless signaling supporting the transfer of data, voice and control information to and from the UE via a base station for the cell (shown in FIG. 5 at the center or vertex for each cell). For example, a UE in a normal coverage area may be able to exchange two-way signaling with a base station for the cell without the need for a handover or a cell change to another cell. An extended coverage area may include an additional area (shown as an annulus in FIG. 5) in which a UE may receive signals from a base station for the cell but may not typically send signaling. For example, a UE in an extended coverage area but not a normal coverage area may camp on a base station for the cell when in an idle state but may not be able to exchange two-way signaling with the base station for more than a short time interval (e.g. a few seconds or less) before a handover or cell change is needed to another cell. In operation, a mobile station may be located within the extended but not normal coverage area of a cell such that it would not normally be served by the cell, but may be able to camp on the cell when in an idle state and may therefore receive broadcast alert messages from that cell. While the distance between the normal coverage areas and the extended coverage area in FIG. 5 are shown as relatively uniform distances, in actuality the coverage areas may vary in size and the distances may not be the same for all cells and may not be the same for the same cell at different times and/or in different directions. The cells are also shown as non-intersecting in FIG. 5 for the purposes of simplifying the disclosure. However, the normal coverage areas and, more particularly, the extended coverage areas are likely to overlap in any operational network.

A first cell 506 is an example of an interior cell because it includes a normal coverage area and an extended coverage area that are both completely within the target area 502. A second cell 508 may also be considered as an interior cell because the extended coverage area is within the border area 504, thereby avoiding a UE that is camped on or served by cell 508 from receiving an alert message when outside both the target area 502 and border area 504. A third cell 510 may be considered an interior cell or an exterior cell based on the requirements of the network operator. A mobile device within the normal coverage area of the third cell 510 may be outside of the target area 502 and thus the operator may consider the third cell 510 as an exterior cell. Alternatively, since the extended coverage area of the third cell 510 is within the border area 504, the operator may consider the third cell 510 as an interior cell. A fourth cell 512 is an example of an exterior cell because the extended coverage area of the cell extends beyond the border area 504. A fifth cell 514 is an example of an exterior cell because the normal coverage area as well as the extended coverage area extends beyond the border area 504. A sixth cell 516 is an example of a cell whose normal and extended coverage areas are completely outside of the target area 502 and would thus not be considered as either an interior or exterior cell. Similarly, a seventh cell 518 is also completely outside of the target area 502, and thus an alert message would not be broadcast in the seventh cell 518.

While each of the cells 506-518 are illustrated with a circular coverage area, some or all cells may include multiple sectors (e.g., 3 sectors), and the interior-exterior classification may be assigned to each sector independently based on the criteria described above. For example, a base station 524 is shown which supports three cell sectors 522a-c. A first cell sector 520a is an example of an exterior cell because while the normal coverage area is within the target area 502 or border area 504, the extended coverage area extends outside of the border area 504. A second cell sector 520b is an example of an interior cell because the normal and extended coverage areas do not extend beyond the border area 504. A third cell sector 520c is an example of a cell which is completely outside of the target area 502 and thus where no broadcast of an alert message is needed. The cell sectors 520a-c show that for some base stations (e.g. base station 524), it may be necessary to convey distinct information (e.g. from an MME 414 or AMF 416) for each cell supported by the base station when providing an alert message to be broadcast by the base station.

FIG. 5 also illustrates a possible problem which may occur when a UE in an exterior cell for an alert message is outside of the target area 502 (and possibly the border area 504) but later moves to a location inside the target area 502. For example, a UE (e.g. one of UEs 405a-f in network architecture 400) may initially be at location 514A in exterior cell 514 which is outside both the target area 502 and border area 504. Here, if the UE receives an alert message for cell 514, the UE may determine that the UE is outside of the target area 502 and border area 504 and may thus not provide the alert message to a user. However, the UE may later move to location 514B in exterior cell 514 which is within the target area 502 and therefore requires provision of the alert message to the user. However, because UE would have already received the alert message and determined not to display the alert message to the user, the UE may ignore reception of later transmissions of the alert message within cell 514 as being duplicates of the alert message already received. In that case, the user may not be provided with the alert message even though the user has moved inside the target area 502. The same problem may occur if, instead of moving from location 514A to location 514B in exterior cell 514, the UE moves from location 514A to another location inside the target area 502 that is in a different cell such as interior cell 506 or exterior cell sector 520a.

The problem as just described may not occur when a UE changes location under other conditions. For example, a UE that is initially inside a first cell that is outside the target area 502 such as cell 516 or cell 518 may later move inside the target area 502 to a second cell such as cell 506, 508, 510, 512 or 514. However, the alert message would not have been received by this UE in the first cell since the first cell, being outside the target area 502, would not have broadcast the alert message. Therefore, when the UE receives the broadcast of the alert message in the second cell, the UE will treat the alert message as a new alert message and provide the alert message to the user according to the various techniques described herein. Similarly, if a UE is initially inside a third cell that is either an interior cell (e.g. cell 506, 508 or 510), or an exterior cell (e.g. cell 512 or 514) where the UE subsequently obtains a location that implies the UE is inside the target area 502, the UE would (normally) provide an alert message to the user when received from the third cell. If the UE later moves to another location inside the target area 502 and possibly to a different fourth cell, the UE may receive further broadcasts of the alert message, but since the UE already provided the alert message to the user, these further broadcasts would be correctly ignored as being duplicates.

To overcome the problem just described of moving into the target area 502 from an exterior cell where a UE initially determines that the UE is not in the target area 502, a UE may use one or more techniques, referred to as techniques T1 herein. With techniques T1, the UE may periodically reobtain its location in order to evaluate whether it has moved into the target area 502. If the UE determines that the UE has moved into the target area 502, the UE may provide the alert message to the user. To support techniques T1, a UE may store the content of the alert message following initial reception and store certain parameters for the alert message (e.g. the warning type or message type, a serial number and the date and time of the initial reception) and may periodically (e.g. based on a fixed periodic interval) reobtain the UE location over a certain duration. Both the duration and the periodic interval may be configured in the UE, provided as parameters for the alert message or determined by the UE based on other parameters for the alert message such as a warning type or message type.

However, reobtaining UE location frequently may consume excessive UE (and network) resources. In addition, the duration for reobtaining the UE location may not be accurate and may be too long or too short (e.g. may be greater than or less than the duration of the emergency alert). To overcome these problems, and as part of techniques T1, a UE that is within (e.g. camped on or accessing) an exterior cell in which an alert message was received but was not provided to a user due to determining that the UE was outside the target area 502, may obtain a new location only when certain trigger events occur. Possible trigger events include expiration of a fixed periodic time interval (e.g. 2-10 minutes) following a previous determination of the UE location, receiving a new broadcast of the alert message from the exterior cell, or determining (e.g. using inertial sensors) that the UE has moved by more than some threshold distance from a previous location determined by the UE as being outside the target area 502. These trigger events may be configured in the UE and/or may be provided by the network (e.g. by a CBC) as one or more parameters in a broadcast of the alert message.

To simplify UE behavior and improve triggering, a combined trigger may be used for techniques T1, whereby a UE that receives a new broadcast of the alert message from the exterior cell reobtains its location if and only if a time interval since a previous location was obtained exceeds some threshold time value (e.g. 2-10 minutes). The combined trigger may avoid a UE reobtaining its location and possibly providing the alert message to the user after the duration of the warning event has expired and the alert message is no longer being broadcast. The combined trigger may also avoid a UE ceasing to reobtain its location before the duration of the warning event has expired. The combined trigger may also avoid a UE needing to store the content of an alert message since the UE can obtain the content of the alert message again from the latest broadcast. Minimally, the UE may just store a warning type (or message type), a serial number, an identity of the exterior cell and a timestamp indicating when the UE last obtained its location. If the UE moves out of the exterior cell into a new cell, the UE may display the alert message unconditionally if later received in the new cell and if the new cell is then indicated to be an interior cell for the alert message. Conversely, if the new cell is indicated to be an exterior cell for the alert message, the UE may continue to use the combined trigger (or other trigger event such as a fixed periodic trigger event) to reobtain its location (e.g. and thus only reobtain its location when receiving a new broadcast of the alert message in the new exterior cell after the threshold time has expired). Alternatively, if the new cell is indicated to be an exterior cell, the UE may unconditionally reobtain its location when receiving a first broadcast of the alert message in the new exterior cell regardless of the time interval since the UE location was last obtained. The UE may subsequently use the combined trigger (or some other trigger event) in the new exterior cell to reobtain its location as previously described if the initial location in the new exterior cell is determined by the UE to be outside the target area 502 (and border area 504). The threshold time for the combined trigger may also be varied—e.g. with a zero value being used to trigger a location whenever the UE receives a new broadcast of the alert message in any exterior cell.

In one simple variant of techniques T1, a UE that initially determines it is outside the target area 502 may periodically reobtain its location (e.g. based on a fixed periodic trigger event or the combined trigger event described above), and determine whether the UE has moved inside the target area 502, only while the UE is camped on or otherwise accessing the original exterior cell in which the alert message was received. If the UE moves into and starts to access a different new cell (e.g. via cell change or handover), the UE may cease reobtaining its location and may delete any previous stored information related to the alert message. The UE may then treat any new broadcast of the alert message as a new alert message and may employ the various techniques described herein to determine whether to display the alert message (e.g. which may include techniques T1 if the new cell is also an exterior cell and if the UE does not initially display the alert message).

In another simple variant of techniques T1, a UE may delete any stored information related to an alert message that is received from an exterior cell if the UE does not provide the alert message to a user due to determining that the UE is outside the target area 502. The UE may then treat any new broadcast of the alert message from any cell as a new alert message (e.g. not as a duplicate) and may employ the various techniques described herein to determine whether to display the alert message (e.g. which may include techniques T1 for an exterior cell if the UE does not initially display the alert message). This variant may be equivalent to a trigger event for periodic location that corresponds to receiving a new broadcast of the alert message.

In a further technique, referred to herein as technique T2, a CMSP operator (e.g. a CBC) may provide an indication (e.g. a flag or a Boolean value) indicating whether a UE shall or shall not provide an alert message to a user for an exterior cell when the UE is not able to determine whether the UE is or is not inside the target area 502. For example, in some locations such as inside a building, inside an elevator, inside a parking garage, inside a tunnel or in a rural area with no GPS or GNSS positioning capability in a UE, it may not be possible for a UE to determine the UE location accurately enough to verify being inside or outside the target area 502 (e.g. if the UE cannot determine its location or determines its location with a possible error greater than the distance D in FIG. 5). In such a case, a UE could be configured to always display the alert messaged, always not display the alert message or display the alert message based on one or message parameters such as a warning type or message type. However, this configuration may not always coincide with the preference of a government or public safety authority or the preference of a CSMP operator. For example, it may be preferable to always display certain alert messages and always not display certain less critical alert messages. Therefore, it may be beneficial to include an extra indication in the broadcast of an alert message, indicating whether a UE shall or shall not display the alert message when unable to determine an accurate location for the UE in the case of an alert message received from an exterior cell. The UE may then display or not display the alert message based on the indication. The extra indication may be determined by a CMSP network (e.g. by a CBC) based on one or more parameters for an alert message such as a warning type, a message type, a source of the alert message and/or a severity of the alert message.

It is noted that in some implementations, a CMSP network operator may choose to classify all network cells that are within or overlap with a target area 502 as being interior cells. Thus, for example, cells 506-514 and 520a and 520b in FIG. 5 may be classified as interior cells. Alternatively, alert messages may be broadcast with a requirement that any cell is to be treated by a UE as an interior cell. With such an implementation or requirement, a UE does not need to obtain the UE location when receiving a broadcast of an alert message from any cell and may instead always provide the alert message to a user (e.g. assuming the alert message is not a duplicate and that a user did not opt out of receiving the type of the alert message).

It is also noted that in some implementations, a CMSP network operator may choose to classify all network cells that are within or overlap with a target area 502 as being exterior cells. Thus, for example, cells 506-514 and 520a and 520b in FIG. 5 may be classified as exterior cells. Alternatively, alert messages may be broadcast with a requirement that any cell is to be treated by a UE as an exterior cell. With such an implementation or requirement, a UE may always need to obtain the UE location when receiving a broadcast of an alert message from any cell in order to determine whether the UE is within the target area 502 and, if so, provide the alert message to the user. For this implementation or requirement, the techniques T1 described above for periodically reobtaining the UE location by the UE may be used in order to ensure that an alert message is provided to a user when a UE is in an exterior cell but is initially outside the target area and later moves inside the target area.

Figure 6:
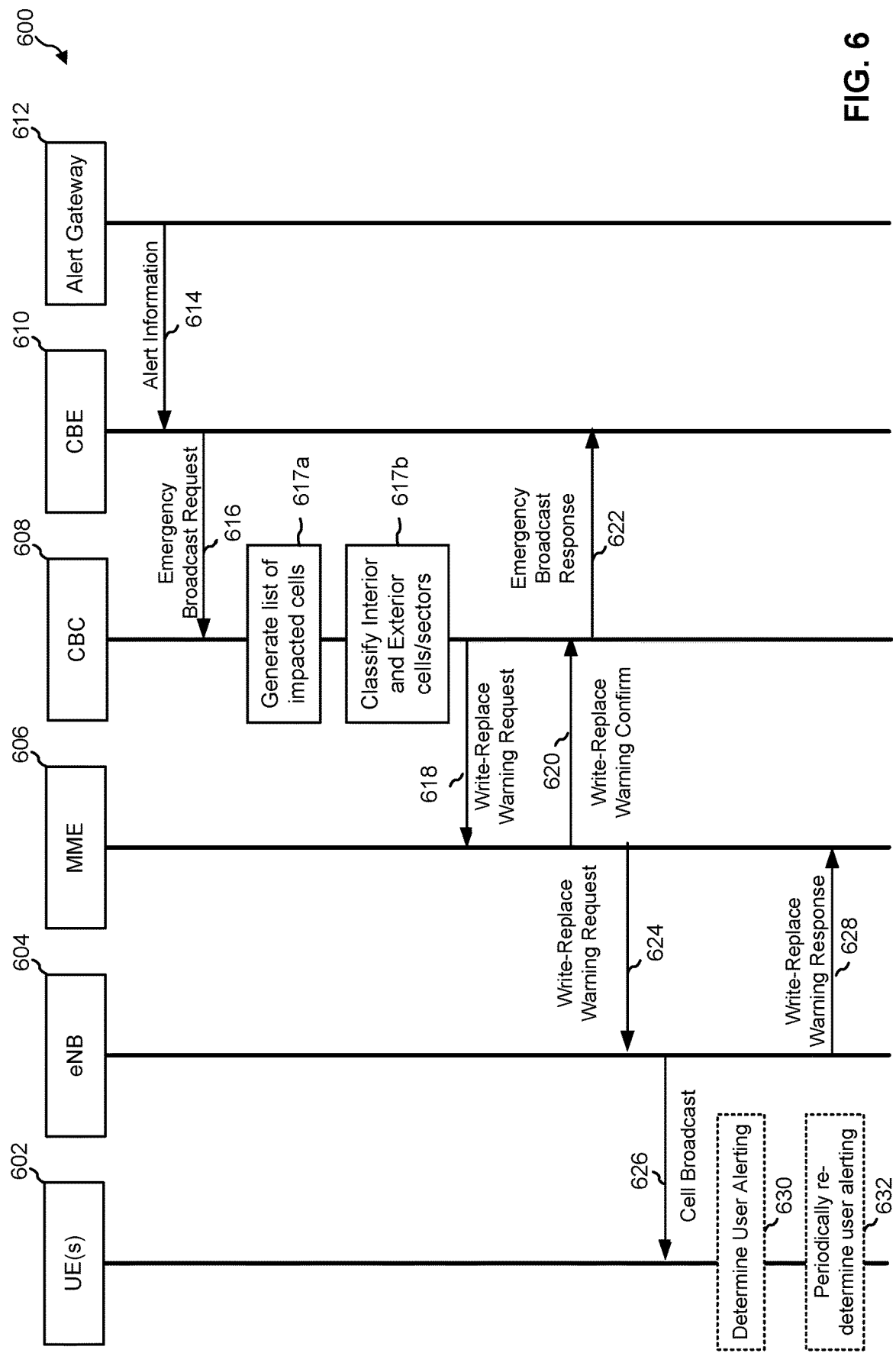
FIG. 6 is an example message flow diagram for providing a wireless emergency alert.
Figure 7:
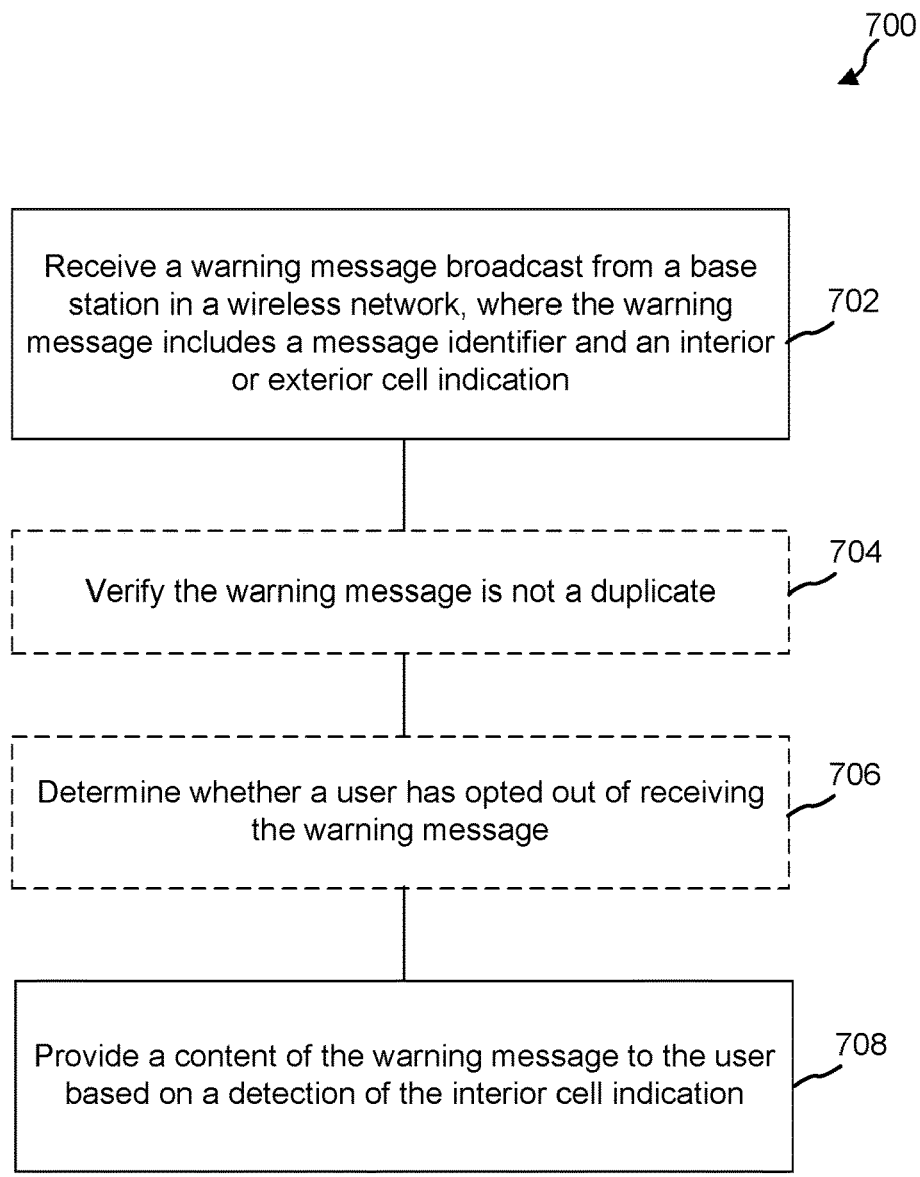
FIG. 7 is a process flow diagram of a method for providing a warning message to a user.
Figure 8:
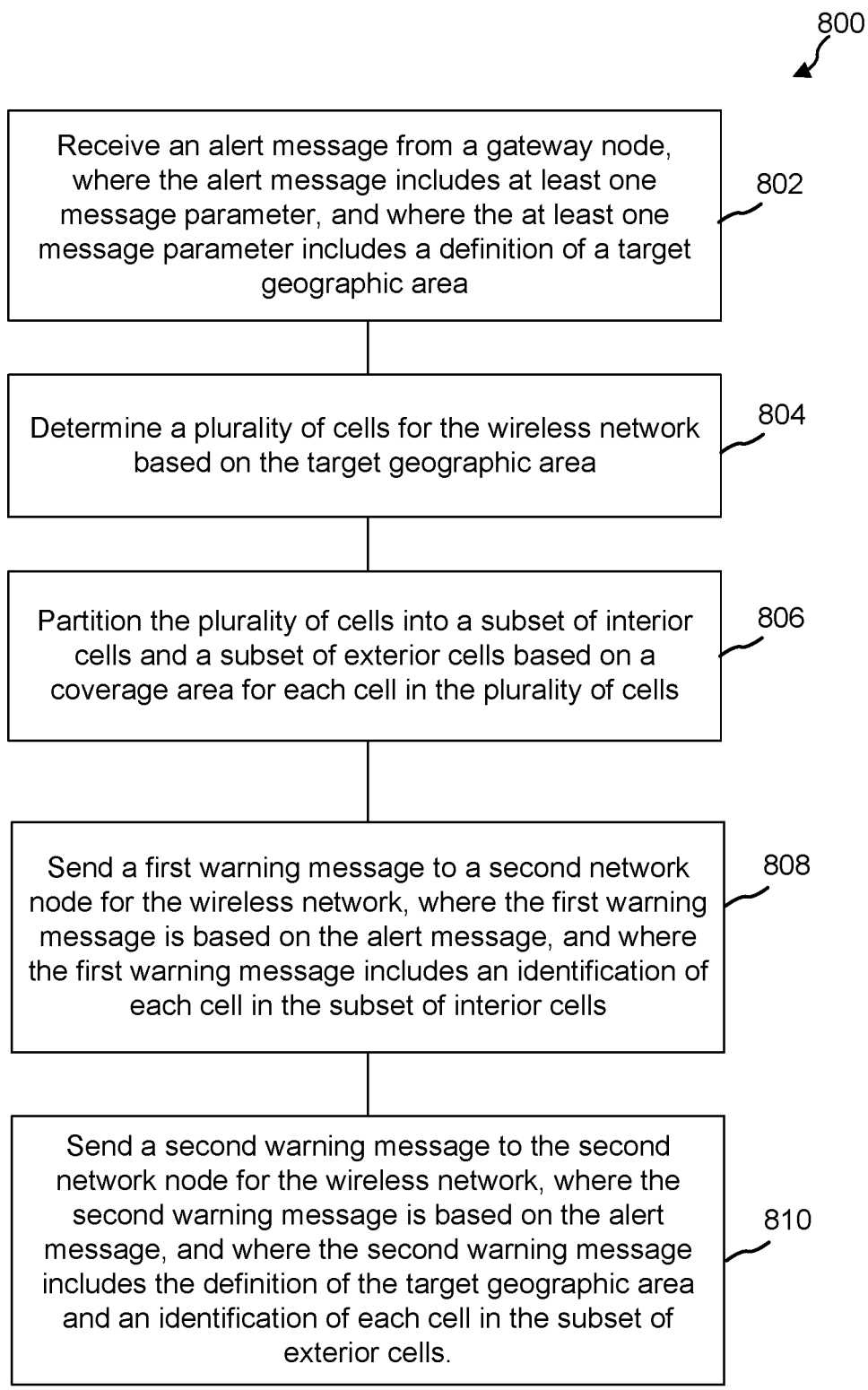
FIG. 8 is a process flow diagram for a method of providing a warning message to a network node.
Figure 9:
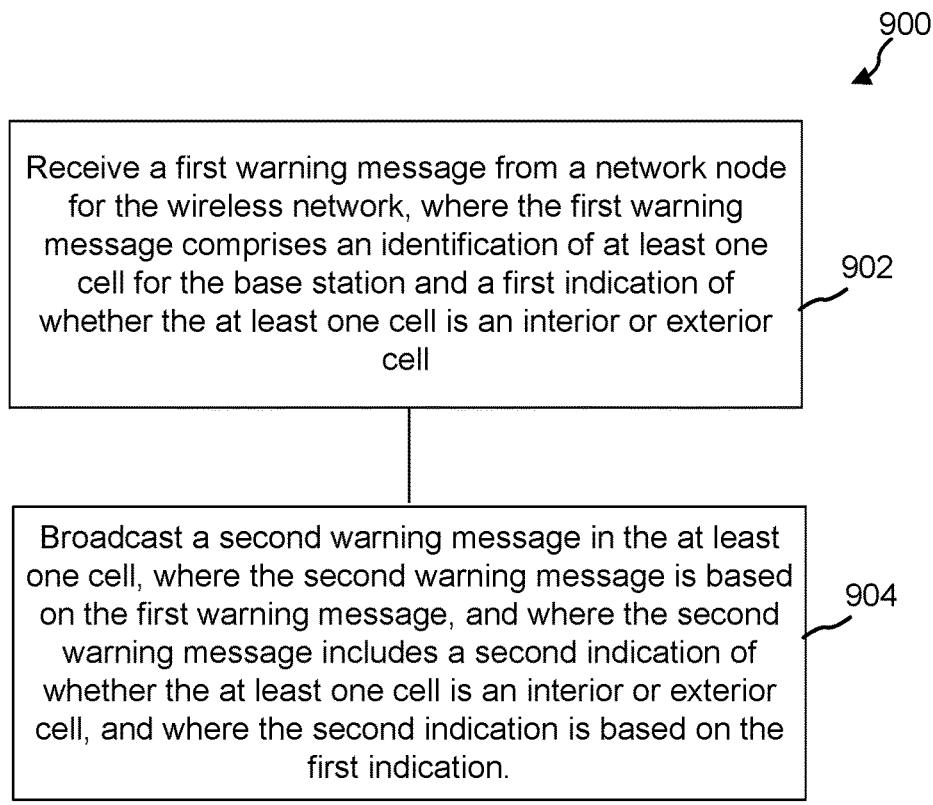
FIG. 9 is a process flow diagram for a method of providing a warning message to a mobile device from a base station.

FIG. 6 shows an example message flow 600 for providing a wireless emergency alert. As described for the example network architecture 400 in FIG. 4, an alert gateway 612 (e.g. corresponding to Federal Alert Gateway 404 in FIG. 4) provides alert information to providers (i.e., CMSPs) that have elected to provide alert information to their subscribers. Providers may utilize various components (e.g., the CBE 610, the CBC 608, the MME 606, and/or the eNB 604) to transmit alert messages to the mobile devices (i.e., UEs 602) in a particular geographic area. For example, CBE 610, CBC 608, MME 606, and eNB 604 may correspond, respectively, to CMSP Gateway 408, CBC 410a, MME 414a (or MME 414b) and eNB 422a (or any of eNBs 422b-c) in FIG. 4. The components included in FIG. 6 may vary for different radio access network architectures. For example, a 5G network may include CBCF 410b, AMF 416 and either ng-eNB 432 or gNB 434 in place of the CBC 608, MME 606, and eNB 604 respectively.

At operation 614 in FIG. 6, alert information may be transmitted from the alert gateway 612 to CBE 610. For example, the alert information may include general information regarding an emergency event, the type of the alert, the warning or alert message itself, and the impact area associated with the emergency event. In an example, the impact area may be defined as a polygon, circle or ellipse which outlines an area on a map. At operation 616, in response to receiving the alert information, the CBE 610 may transmit an emergency broadcast request signal (e.g. a message) containing the alert information to the CBC 608. The emergency broadcast request signal may include one or more fields to describe a warning type, a warning message, a duration and frequency for broadcasting, and the impact area. It is noted that while a single impact area is referred to herein, an impact area may comprise two or more non-overlapping areas, in which case a definition for the impact area may comprise the definition of two or more separate geographic shapes (e.g. such as two or more polygons).

At stage 617a, the CBC 608 is configured to process the received emergency broadcast request information to generate a list of impacted cells (or impacted tracking areas or impacted emergency areas). The impacted cells (or impacted tracking areas or emergency areas) may comprise cells (or tracking areas or emergency areas) whose coverage areas (e.g. normal coverage area and/or extended coverage area) are totally within the impact area or at least partially within the impact area. Other factors, such as the warning type, may also be used to help determine the impacted cells (or impacted tracking areas or impacted emergency areas). At stage 617b, the CBC 608 may be configured to determine whether each of the impacted cells and/or cell sectors (or each of the impacted tracking areas or emergency areas) is an interior or exterior cell or cell sector (or an interior or exterior tracking area or emergency area) as described for FIGS. 3 and 5 in the case of cells and cell sectors. For example, the determination at stage 617b may comprise partitioning the impacted cells (or impacted tracking areas or emergency areas) into a first subset of interior cells (or interior tracking areas or emergency areas) and a second subset of exterior cells (or exterior tracking areas or emergency areas). As noted previously, the terms "interior cells" and "exterior cells" may be replaced by equivalent definitions, such as "cells for which UE location verification is not needed" and "cells for which UE location verification is needed", respectively.

At operation 618, CBC 608 may be configured to transmit a write-replace warning request message to MME 606 containing the warning message and the delivery attributes (e.g., one or more of a message identifier, serial number, tracking area ID list, warning area, an Operation and Maintenance Center (OMC) identity (ID), a Concurrent Warning Message (CWM) indicator, a send write-replace-warning indication, and/or a global eNB ID) to the MME 606. The tracking area ID list may comprise IDs for tracking areas that each include one or more of the impacted cells (or that each include, or are the same as, one or more of the impacted tracking areas or impacted emergency areas) determined at stage 617a, and may be used by MME 606 to determine eNBs such as eNB 604 to which the warning message should be transferred. The warning area (also referred to as a warning area list) may comprise a list of the impacted cells (or impacted tracking areas or impacted emergency areas) determined at stage 617a. The delivery attributes may also include a duration and/or frequency of broadcasting, a definition of the impact area, and a flag, Boolean parameter or other indication to indicate whether each of the impacted cells (or impacted tracking areas or impacted emergency areas) determined at stage 617a (or any subset of these cells (or tracking areas or emergency areas) conveyed by operation 618) is an interior or exterior cell (or an interior or exterior tracking area or emergency area) according to the determination at stage 617b. In one embodiment, CBC 608 may also include in the delivery attributes an indication for each exterior cell (or each exterior tracking area or emergency area) as to whether a UE 602 shall or shall not provide the alert message to a user when unable to determine whether the UE is or is not in the impact area as described above for technique T2. For example, the indication may be based on one or more parameters for the alert message such as a warning type, a message type, a source of the alert message and/or a severity of the alert message.

In one embodiment, referred to here as embodiment E2, of operation 618, the CBC 608 may be configured to generate two separate write-replace warning request messages based on the interior-exterior determination and/or type of base station. For example, and as described above for embodiment E1 for FIG. 4, a first write-replace warning request message transferring a warning message with a first message identifier may be used to transfer the warning message for broadcast in interior cells and cell sectors (or interior tracking areas or emergency areas). A second write-replace warning request message transferring a warning message with a second message identifier different to the first message identifier may then be used to transfer the warning message for broadcast in exterior cells and cell sectors (or exterior tracking areas or emergency areas). The target area may then be included in the second but not the first write-replace warning request message. In another example of embodiment E2 of operation 618, CBC 608 may be configured to generate a first write-replace warning request message containing impact area information for exterior cells (or exterior tracking areas or emergency areas), and a second write-replace warning request message for interior cells (or interior tracking areas or emergency areas) which does not contain the impact area, and where the first and second write-replace warning request messages may have the same message identifier. Other message fields and messaging techniques may be used to indicate whether a particular cell or cell sector (or particular tracking areas or emergency area) is an interior cell or an exterior cell (or an interior or exterior tracking area or emergency area). For example, the warning messages may use and/or expand the coding schemes specified in the Third Generation Partnership Project (3GPP) Technical Specification (TS) 23.038.

After MME 606 receives the write-replace warning request message at operation 618 (or either of the two write-replace warning request messages sent at operation 618 for the embodiment E2 of operation 618), the MME 606 may transmit a write-replace warning confirm message back to the CBC 608 at operation 620. At operation 622, in response to receiving the write-replace warning confirm message (or two write-replace warning confirm messages in the case of embodiment E2 of operation 618), CBC 608 may transmit an emergency broadcast response message back to the CBE 610. At operation 624, MME 606 forwards the write-replace warning request message to eNB 604 after utilizing the tracking area ID list received from the CBC 608 to determine eNB 604 and other eNBs to which the warning message should be sent. The write-replace warning message may include a description of the impact area (e.g., a polygon shape), a list of the impacted cells (or the impacted tracking areas or emergency areas) (e.g. the warning area received at operation 618) and an indication of the interior-exterior cell classifications (or interior-exterior tracking area or emergency area classifications). At operation 626, in response to receiving the write-replace warning response message, eNB 604 may determine in which cell or cells supported by eNB 604 broadcast of the warning message is needed. ENB 604 may determine the cell or cells based on a list of impacted cells (or impacted tracking areas or impacted emergency areas) (e.g. contained in a warning area parameter) received from MME 606 at operation 624. ENB 604 may then broadcast the warning message in the determined cells as part of operation 626, e.g. at a frequency and for a duration indicated by delivery attributes received at operation 624. In some embodiments, eNB 604 may segment the warning message into two or more message segments, e.g. if the warning message exceeds a maximum broadcast message size (e.g. a maximum SIB size). ENB 604 may then broadcast each message segment as a separate message, e.g. as a separate RRC message such as a SIB12.

During broadcast delivery in a particular cell, the eNB 604 may transmit an alert message including a definition or description of the impact area to indicate the impacted area and an indication as to whether the cell (or the eNB 604) is classified as an interior cell or an exterior cell. In one example, a flag, Boolean parameter or other variable may be included in the alert message to indicate the interior-exterior classification. In another example, an exterior cell may be indicated by an inclusion of a definition of the impact area in the broadcast alert message, whereas an interior cell may be indicated by an exclusion of a definition of the impact area in the broadcast alert message. In a further example, an interior cell and exterior cell may be distinguished by use of a different message identifier for the broadcast alert message. In other examples, other fields within the alert message may be used to indicate the classification of a cell or cell sector as either an interior or exterior cell.

In cases where the write-replace warning request message sent at operation 624 includes a list of impacted tracking areas or emergency areas and an interior-exterior classification for each tracking area or emergency area, eNB 604 may determine one or more cells supported by eNB 604 that are configured to be part of each impacted tracking area or emergency area and may determine an interior-exterior classification for each determined cell to be the same as the interior-exterior classification for the corresponding impacted tracking area or emergency area.

At operation 628, the eNB 604 may transmit a write-replace warning response message (or signal) back to the MME 606. In some configurations, operation 626 and operation 628 may be performed at (or nearly at) the same time. At operation 630, in response to the cell broadcast delivery from the eNB 604, UE 602 determines whether user alerting is needed, based on a received interior-exterior classification and/or a definition of the impact area. As part of operation 630, UE 602 may provide user alerting if a need for user alerting is determined. For example, a UE 602 which receives an alert from an interior cell or cell sector may perform user alerting immediately, without obtaining a current position. A UE 602 which receives an alert from an exterior cell or cell sector may first determine or estimate its current location (e.g. as described for FIG. 4) and perform user alerting only if the current location implies that UE 602 is or may be within the impact area. For example, UE 602 may assume that UE 602 may be in the impact area if an estimated location for UE 602 is within the impact area or a border area for the impact area (e.g. as described in association with FIG. 2B). In one embodiment, and as described for technique T2 above, an alert message received by UE 602 from an exterior cell may include an indication as to whether a UE shall or shall not display the alert message to a user when unable to determine whether the UE is or is not in the impact area. In this embodiment, if UE 602 is unable to obtain an accurate location at operation 630 and therefore is unable to determine whether UE 602 is or is not in the impact area, UE 602 may either display or not display the alert message to the user according to the indication. In some configurations, user alerting may include displaying a text message and/or a picture on a display of the UE 602 and/or sounding an audible alarm. In some configurations, user alerting may include displaying map-related information on the display of the UE 602. For example, referring to FIG. 2B, the map-related information may include a polygon shape to indicate the impacted area.

In some embodiments, if UE 602 receives the alert message from an exterior cell or cell sector and determines that user alerting is not needed at operation 630 due to obtaining a location for UE 602 which implies that UE 602 is not in the impact area, UE 602 may periodically re-determine whether use alerting is needed at operation 632. Operation 632 is optional and may not occur in all embodiments. Operation 632 may correspond to use of techniques T1 described above for FIG. 5. For example, as part of operation 632, UE 602 may periodically reobtain a location estimate for UE 602 and determine whether the new location estimate implies that UE 602 has moved into the impact area or a border area for the impact area and may, if this is implied, perform user alerting. As described above for FIG. 5, UE 602 may reobtain the location estimate at operation 632 at fixed periodic intervals or based on other trigger events or combined trigger events such as receiving a new broadcast of the alert message, detecting a movement of UE 602 by more than a threshold distanced from a previous location for UE 602 or receiving a new broadcast of the alert message after a threshold time interval following obtaining a previous location estimate for UE 602. UE 602 may continue to perform operation 632 until UE 602 performs user alerting, until a maximum duration for performing operation 632 is attained, until UE 602 moves into and accesses a new cell, and/or until no more broadcasts for the alert messaged are received by UE 602 during some time interval (e.g. 15 to 60 minutes) which may be configured in UE 602. UE 602 may also or instead continue to perform operation 632 after UE 602 moves into and accesses a new cell and may optionally cease performing operation 632 if and when UE 602 receives a new broadcast of the alert message in the new cell. In order to perform operation 632, UE 602 may store a content and/or one or more parameters (e.g. a warning or message type and a serial number) for the alert message as received for operation 626.

With further reference to FIGS. 1-6, FIG. 7 shows a flow chart of a method 700, generally performed at a mobile device, of providing a warning message to a user. The method 700 is, however, an example only and not limiting. The method may be performed by a mobile device such as mobile device 208, any of UEs 405*a-f*, or UE 602. The method 700 may be altered, e.g., by having stages added, removed, rearranged, combined, performed concurrently, and/or having single stages split into multiple stages. Stages 704 and 706 are optional and are thus shown in dashed lines.

At stage 702, the method 700 includes receiving a warning message broadcast from a base station in a wireless network (e.g. a CMSP network), where the warning message includes a message identifier and an interior or exterior cell indication. The interior or exterior cell indication may refer to the cell or cell sector in which or using which the warning message is received. The interior cell indication may comprise an indication of a cell for which location verification of the mobile device is not needed and the exterior cell indication may comprise an indication of a cell for which location verification of the mobile device is needed. The base station may be an eNB (e.g. any of eNBs 422*a-d*), an ng-eNB (e.g. ng-eNB 432), a gNB (e.g. gNB 434), or some other base station or access point (e.g. an IEEE 802.11 WiFi access point, Bluetooth beacon or a Node B supporting UMTS radio access). The warning message may comply with established protocols (e.g., may be broadcast using a Radio Resource Control (RRC) protocol in a SIB12). The warning message may include one or more predefined data fields or parameters such as: (i) the message identifier; (ii) a definition (e.g. based on latitude and longitude information) of a geographic area which may correspond to a target area or impact area for the warning message; (iii) a warning type or message type which may indicate the general nature, source and severity of the warning message; (iv) a serial number which may identify the warning message and enable duplicate message detection; and (v) message content which may in some implementations comprise up to 360 readable text characters. In some implementations, the warning message may be received at stage 702 in two or more separate segments (e.g. with each segment broadcast in a separate SIB12 message by the base station), in which case method 700 may further comprise reassembling the segments to obtain the warning message. The geographic area may include or comprise a polygon, a circle, an ellipse or some other two-dimensional area or possibly three-dimensional volume (e.g. such as corresponding to the upper floors of a tall building). In an example, a warning message may include one or more data elements/symbols (e.g., flag or a Boolean value) to convey the interior or exterior cell indication. In an example, the interior or exterior cell indication may be inferred by the presence or absence of the definition of the geographic area in the warning message (e.g., where an absence of the definition of the geographic implies an interior cell and where a presence of the definition implies an exterior cell). In an example, the message identifier may be used to infer the interior or exterior cell indication. For example, and as described for embodiment E1 for FIG. 4, a particular message identify may indicate an interior cell and another different message identifier may indicate an exterior cell. In an aspect, stage 702 may correspond to operation 626 for FIG. 6.

At stage 704, the method may optionally include verifying the warning message is not a duplicate. For example, the mobile device performing method 700 may be configured to verify that the same warning message was not previously received and/or shown to the user. For example, the mobile device may be configured to verify that a warning message containing the same message identifier and same serial number as received at stage 702 was not previously received within a defined time period. In case of a duplicate, the warning message may be discarded.

At stage 706, the method may optionally include determining whether the user has opted out of receiving the warning message. For example, a user of the mobile device may provide an indication to selectively opt out of displaying some warning message types as indicated by the message identifier. Other warning types, such as a Presidential warning message identifier, may be considered mandatory and always displayed to a user.

At stage 708, the method includes providing a content of the warning message to the user based on a detection of the interior cell indication. In an embodiment, upon the optional determination that the user has not opted out of receiving the warning message at stage 706, the mobile device may be configured to provide a content of the warning message to the user based on the detection of the interior cell indication. The warning message may include, for example, a flag or other variable that may be interpreted by the mobile device as an interior cell indication. In another example, the warning message may not include the definition of the geographic area, which may be interpreted as an indication of an interior cell. In another example, the message identifier may be used to infer an indication of an interior cell. The implication of receiving a warning message for an interior cell is that the mobile device is currently located within the impacted area and thus should provide an alert without the need to determine a current location. The content of the warning message may include at least a portion of data that may be used to enable the mobile device to provide an alert to the user. For example, the content may include text or other machine readable code associated with text messaging or map information (e.g., a boundary line). An alert may be any form of visual, audio, haptic, or radio output (e.g., BLUETOOTH, Wi-Fi message to a peripheral device) configured to provide information to one or more users. In an aspect, stage 708 may correspond to part of operation 630 for FIG. 6.

In some aspects or embodiments, the method 700 may include additional actions. In one aspect, the method additionally includes detecting the exterior cell indication in the warning message, determining a location estimate for the mobile device based on detecting the exterior cell indication, and determining whether the mobile device is within or outside the geographic area based on the location estimate. In this aspect, the method may further comprise determining that the mobile device is within the geographic area and providing the content of the warning message to the user based on determining that the mobile device is within the geographic area. As an example, the mobile device may determine the location estimate using GPS, A-GPS, GNSS, A-GNSS, WLAN, OTDOA, ECID and/or sensor-based position methods. In this aspect, determining that the mobile device is within the geographic area may comprise at least one of determining that the location estimate is within the geographic area, determining that the location estimate is within a threshold distance of and outside the geographic area (e.g. within a border area as exemplified in FIG. 5), or determining that the location estimate is either within the geographic area or within the threshold distance of and outside the geographic area. As an example, the warning message may include the threshold distance or the threshold distance may be configured in the mobile device. The threshold distance may correspond to the distance D in FIG. 5. In this aspect, the location estimate may include an error component, and determining that the mobile device is within the geographic area may comprise determining that the mobile device is within the geographic area with a threshold confidence (e.g. such as 95% or 98%). This aspect may include an additional embodiment in which the method further comprises determining that the mobile device is outside the geographic area, periodically reobtaining a new location estimate for the mobile device; and determining whether the mobile device has moved inside the geographic area based on the new location estimate (e.g. as described for operation 632 for FIG. 6). In this additional embodiment, the method may also comprise determining that the mobile device has moved inside the geographic area and providing the content of the warning message to the user based on determining that the mobile device has moved inside the geographic area. In this additional embodiment, periodically reobtaining the new location estimate may comprise reobtaining the new location estimate following an occurrence of a trigger event, where the trigger event may include at least one of an expiration of a periodic interval, a determination of a movement of the mobile device by more than a threshold distance from a previous location for the mobile device, receiving a new broadcast of the warning message, or receiving a new broadcast of the warning message after expiration of a threshold time interval following obtaining a previous location estimate for the mobile device. The additional embodiment may also comprise ceasing to reobtain the new location estimate following at least one of an expiration of a maximum duration, ceasing to receive a broadcast of the warning message or performing a cell change or a handover to a new cell. The additional embodiment may correspond to one or more of the techniques T1 described above in association with FIG. 5 and/or to operation 632 described above for FIG. 6. In another embodiment of this aspect, the warning message received at stage 702 (from the exterior cell) further includes an indication as to whether the mobile device shall or shall not provide the warning message to the user when unable to determine whether the mobile device is within or outside the geographic area. In this other embodiment, the mobile device may determine that the mobile device either may or may not be within the geographic area (e.g. because the location estimate obtained by the mobile device is not accurate or the mobile device cannot obtain a location estimate). The mobile device may then provide the content of the warning message to the user when the indication indicates that the mobile device shall provide the warning message, and may not provide the content of the warning message to the user when the indication indicates that the mobile device shall not provide the warning message.

With further reference to FIGS. 1-6, FIG. 8 shows a flow chart of a method 800 for providing a warning message to mobile devices served by a wireless network (e.g. a CMSP network) at a network node. Method 800 may be performed by a first network node for the wireless network such as a CBC (e.g. CBC 410a, CBCF 410b or CBC 608), a CBE (e.g. CBE 408, CBE 610) or some other node such as an MME (e.g. MME 414 or MME 606) or AMF (e.g. AMF 416). The method 800 is, however, an example only and not limiting. The method 800 may be altered, e.g., by having stages added, removed, rearranged, combined, performed concurrently, and/or having single stages split into multiple stages.

At stage 802, the method 800 includes receiving an alert message from a gateway node, where the alert message includes at least one message parameter, and where the at least one message parameter includes a definition of a target geographic area. For example, the gateway node may be a CMSP Gateway or CBE (e.g. CMSP Gateway 408) or a Federal Alert Gateway (e.g. Federal Alert Gateway 404). The at least one message parameter may be associated with an emergency information and may also include a warning type, a warning message content and a time period. The target geographic area may be defined by a polygon, circle, ellipse or some other two-dimensional area or possibly three-dimensional volume (e.g. such as corresponding to the upper floors of a tall building). The definition of the target geographic area may also include an indication of a boundary area or border area such as described for FIG. 5. In an aspect, stage 802 may correspond to operation 616 for FIG. 6.

At stage 804 the method 800 includes determining a plurality of cells for the wireless network based on the target geographic area. For example, cells for the wireless network may have known coverage areas (e.g. as determined by drive by testing, signal level reports from UEs in the wireless network or radio propagation computations) which may be stored in or accessible to the first network node. The coverage area for each cell may include an indication of a normal coverage area and an extended coverage area such as depicted in FIG. 5. The first network node may determine the plurality of cells by determining which cells have at least a portion of their respective coverage areas within the target geographic area and thus overlap the target geographic area (e.g. as described in association with FIG. 5). In an aspect, stage 804 may correspond to stage 617a for FIG. 6.

At stage 806, the method 800 includes partitioning the plurality of cells into a subset of interior cells and a subset of exterior cells based on a coverage area for each cell in the plurality of cells. For example, partitioning the plurality of cells may include assigning each cell in the plurality of cells to the subset of interior cells when and only when the coverage area of the each cell is (i) wholly within the target geographic area, or (ii) partially within the target geographic area and not extending by more than a threshold distance outside of the target geographic area. The coverage area of each cell may be a normal coverage area (e.g. a coverage area where a mobile device may be able to exchange two-way signaling with a base station for the cell) or may be an extended coverage area (e.g. an area including a normal coverage area and an additional area or areas where a mobile device may not be able to exchange two-way signaling with a base station for the cell for more than a short interval). Examples of condition (i) for stage 806 are provided by cell 506 in FIG. 5 and cell 508 in the case that the coverage area of a cell 508 corresponds to a normal coverage area rather than an extended coverage area as described for FIG. 5. Examples of condition (ii) for stage 806 are provided by cell 510 in FIG. 5 and cell 508 in the case that the coverage area of cell 508 corresponds to an extended coverage area rather than a normal coverage area as described for FIG. 5. The threshold distance may be known to (e.g. configured in) the first network node or may be included in the at least one message parameter received at stage 802. The threshold distance may correspond to the distance D in FIG. 5 in some embodiments and/or to a border area as illustrated in FIGS. 3 and 5. In an aspect, the threshold distance may be zero. In an aspect, stage 806 may correspond to stage 617b for FIG. 6.

At stage 808, the method 800 includes sending a first warning message to a second network node for the wireless network, where the first warning message is based on the alert message, and where the first warning message includes an identification of each cell in the subset of interior cells. For example, the first warning message may include a warning area (or warning area list) comprising at least an identification of the subset of interior cells determined at stage 806. For example, the warning message may include an identifier (e.g. a cell global identifier) for each cell in the subset of interior cells and possibly an indication that each cell is an interior cell. In an aspect, an indication of an interior cell may comprise an indication of a cell for which location verification of a mobile device is not needed. In an aspect, the second network node is an MME (e.g. MME 414a or MME 414b) or an AMF (e.g. AMF 416). In an aspect, stage 808 may correspond to operation 618 for FIG. 6.

At stage 810, the method 800 includes sending a second warning message to the second network node for the wireless network, where the second warning message is based on the alert message, and where the second warning message includes the definition of the target geographic area and an identification of each cell in the subset of exterior cells. For example, the second warning message may include a warning area (or warning area list) comprising at least an identification of the subset of exterior cells determined at stage 806. For example, the warning message may include an identifier (e.g. a cell global identifier) for each cell in the subset of exterior cells and possibly an indication that each cell is an exterior cell. In an aspect, an indication of an exterior cell may comprise an indication of a cell for which location verification of a mobile device is needed. In an aspect, stage 810 may correspond to operation 618 for FIG. 6.

Method 800 may include additional aspects. In one aspect, the first warning message and the second warning message are the same warning message (e.g. which may be sent once only to the second network node). In this aspect, the identification of each cell in the subset of interior cells may include an indication of an interior cell, and the identification of each cell in the subset of exterior cells may include an indication of an exterior cell. For example, the indication of an interior cell and/or the indication of an exterior cell may comprise a flag, a Boolean value or some other parameter.

In another aspect, the first warning message includes a first message identifier and the second warning message includes second message identifier, where the first message identifier and second message identifier are based on the at least one message parameter received at stage 802 and are different. For example, this aspect may correspond to embodiment E1 as described for FIG. 6.

In a further aspect, the second network node forwards the first warning message to a first plurality of base stations associated with the subset of interior cells and forwards the second warning message to a second plurality of base stations associated with the subset of exterior cells, e.g. as at operation 624 for FIG. 6. The first plurality of base stations may then broadcast the first warning message in each cell in the subset of interior cells and the second plurality of base stations may broadcast the second warning message in each cell in the subset of exterior cells, e.g. as at operation 626 for FIG. 6.

With further reference to FIGS. 1-6, FIG. 9 shows a flow chart for a method 900 for providing a warning message to a mobile device at a base station for a wireless network (e.g. a CMSP network). Method 900 may be performed by a base station such as an eNB (e.g. any of eNBs 422a-d or eNB 604), an ng-eNB (e.g. ng-eNB 432), a gNB (e.g. gNB 434), or some other base station or access point (e.g. an IEEE 802.11 WiFi access point, Bluetooth beacon or a Node B supporting UMTS radio access). The method 900 is, however, an example only and not limiting. The method 900 may be altered, e.g., by having stages added, removed, rearranged, combined, performed concurrently, and/or having single stages split into multiple stages.

At stage 902, the method 900 includes receiving a first warning message from a network node for the wireless network, where the first warning message comprises an identification of at least one cell for the base station and a first indication of whether the at least one cell is an interior or exterior cell. In one aspect, the network node is an AMF (e.g., AMF 416) and the base station is a ng-eNB (e.g. ng-eNB 432) or a gNB (e.g. gNB 434). In another aspect, the network node is an MME (e.g. MME 414a, MME 414b or MME 606) and the base station is an eNB (e.g. one of eNBs 422a-d or eNB 604). In an aspect, the identification of the least one cell may be part of a warning area or a warning area list and may comprise an identifier for the at least one cell such as a cell global identifier. In an aspect the first indication of whether the at least one cell is an interior or exterior cell may comprise the presence or absence of a flag, a Boolean value or the presence or absence of a definition of a target geographic area for the first warning message. In an aspect, stage 902 may correspond to operation 624 for FIG. 6.

At stage 904, the method includes broadcasting a second warning message in the at least one cell, where the second warning message is based on the first warning message, and where the second warning message includes a second indication of whether the at least one cell is an interior or exterior cell, and where the second indication is based on the first indication. In one aspect, the first indication and the second indication are both indications of an interior cell or both indications of an exterior cell. For example, the second indication may be the same as the first indication and both indications may comprise explicit indications of an interior or exterior cell such as using a flag or a Boolean value. In one aspect, the first warning message includes a definition of a target geographic area (e.g. a polygon, circle or ellipse). In this aspect, the method may further comprise including the definition of the target geographic area in the second warning message when the first indication is an indication of an exterior cell. In this aspect, the method may also comprise excluding the definition of the target geographic area in the second warning message when the first indication is an indication of an interior cell. In this aspect, the second indication may comprise the inclusion or exclusion of the definition of the target geographic area in the second warning message. In an aspect, broadcasting the second warning message at stage 904 may include segmenting the second warning message into two or more message segments and broadcasting each message segment as a separate message, e.g. using an RRC message such as a SIB12. In an aspect, stage 904 may correspond to operation 626 for FIG. 6.

While the above examples have been described in general terms of relating to LTE and 5G architectures, the disclosure is not so limited. The modulation and multiple access scheme employed by the example access networks may vary depending on the particular telecommunications standard being deployed. For example, in LTE applications, OFDM is used on the DL and SC-FDMA is used on the UL to support both frequency division duplex (FDD) and time division duplex (TDD). These concepts may be extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
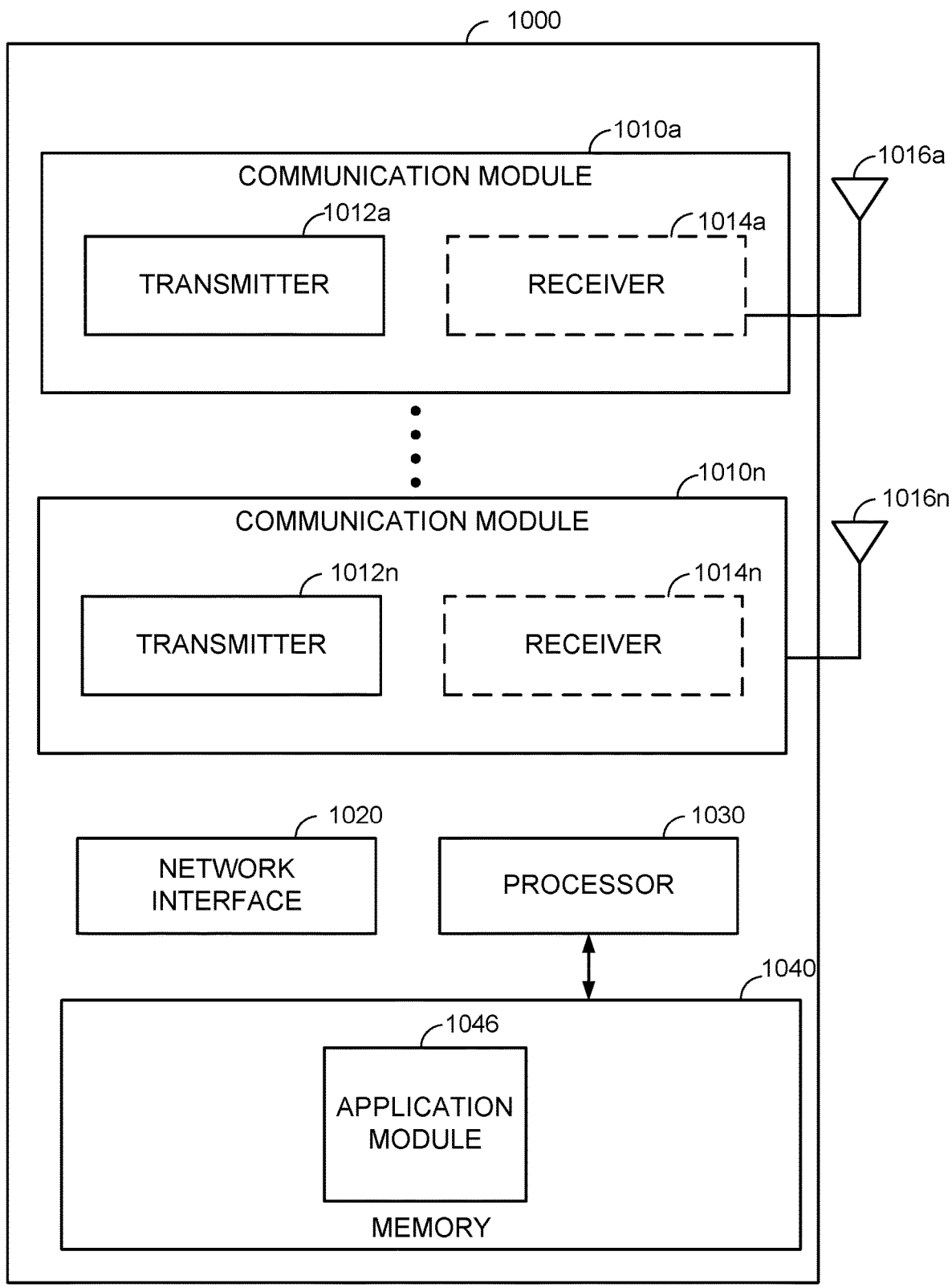
FIG. 10 is a schematic diagram of an example wireless node.

Referring to FIG. 10, a schematic diagram of an example wireless node 1000 is shown. A wireless node 1000 may be a base station, access point, or server, which may be similar to, and be configured to have a functionality similar to that, of any of the various nodes depicted, for example, in FIGS. 1, 2A, 3, 4, 5 and 6 (e.g., base stations, eNB, ng-eNB, gNB), or otherwise discussed herein (e.g., CBE, CBC, MME). For example, wireless node 1000 may correspond to any of eNBs 422a-d, ng-eNB 432, gNB 434, CBC 410a, CBCF 410b, CBE 408, eNB 604, CBC 608, CBE 610, MME 414a, MME 414b, AMF 416 or MME 606. The wireless node 1000 may include one or more communication modules 1010a-n, which may be electrically coupled to one more antennas 1016a-n for communicating with wireless devices. Each of the communication modules 1010a-1010n may include a respective transmitter 1012a-n for sending signals (e.g., downlink messages, which may be arranged in frames) and, optionally (e.g., for nodes configured to receive and process uplink communications) a respective receiver 1014a-n. In embodiments in which the implemented node includes both a transmitter and a receiver, the communication module comprising the transmitter and receiver may be referred to as a transceiver. The node 1000 may also include a network interface 1020 to communicate with other network nodes via wireline means (e.g., by sending and receiving queries and responses). For example, the node 1000 may be configured to communicate (e.g., via wired or wireless backhaul communication) with a gateway, or other suitable device of a network, to facilitate communication with one or more core network nodes (e.g., any of the other nodes and elements shown in FIG. 4 or FIG. 6). Additionally, and/or alternatively, communication with other network nodes may also be performed using the communication modules 1010a-n and/or respective antennas 1016a-n.

The node 1000 may also include other components that may be used with embodiments described herein. For example, the node 1000 may include, in some embodiments, a processor (also referred to as a controller) 1030 to manage communications with other nodes (e.g., sending and receiving messages), to generate communication signals, and to provide other related functionality, including functionality to implement the various processes and methods described herein. Thus, for example, the processor, in combination with other modules/units of the node 1000, may be configured to cause the node 1000, when functioning as a base station, to generate alert messages for at least one cell for the base station, including an interior-exterior cell indication and a geographic area.

The processor 1030 may be coupled to (or otherwise communicate with) a memory 1040, which may include one or more modules (implemented in hardware of software) to facilitate controlling the operation of the node 1000. For example, the memory 1040 may include an application module 1046 with computer code for various applications required to perform the operation of the node 1000. For example, the processor 1030 may be configured (e.g., using code provided via the application module 1046, or some other module in the memory 1040) to broadcast alert messages including one or more interior-exterior classifications. The wireless node 1000 may also be configured, in some implementations, to perform location data services, or perform other types of services, for multiple wireless devices (clients) communicating with the wireless node 1000 (or communicating with a server coupled to the wireless node 1000), and to provide location data and/or assistance data to such multiple wireless devices. For example, a wireless node 1000 may be configured to generate a tracking area ID list, or list of impacted cells based on received input.

Figure 11:
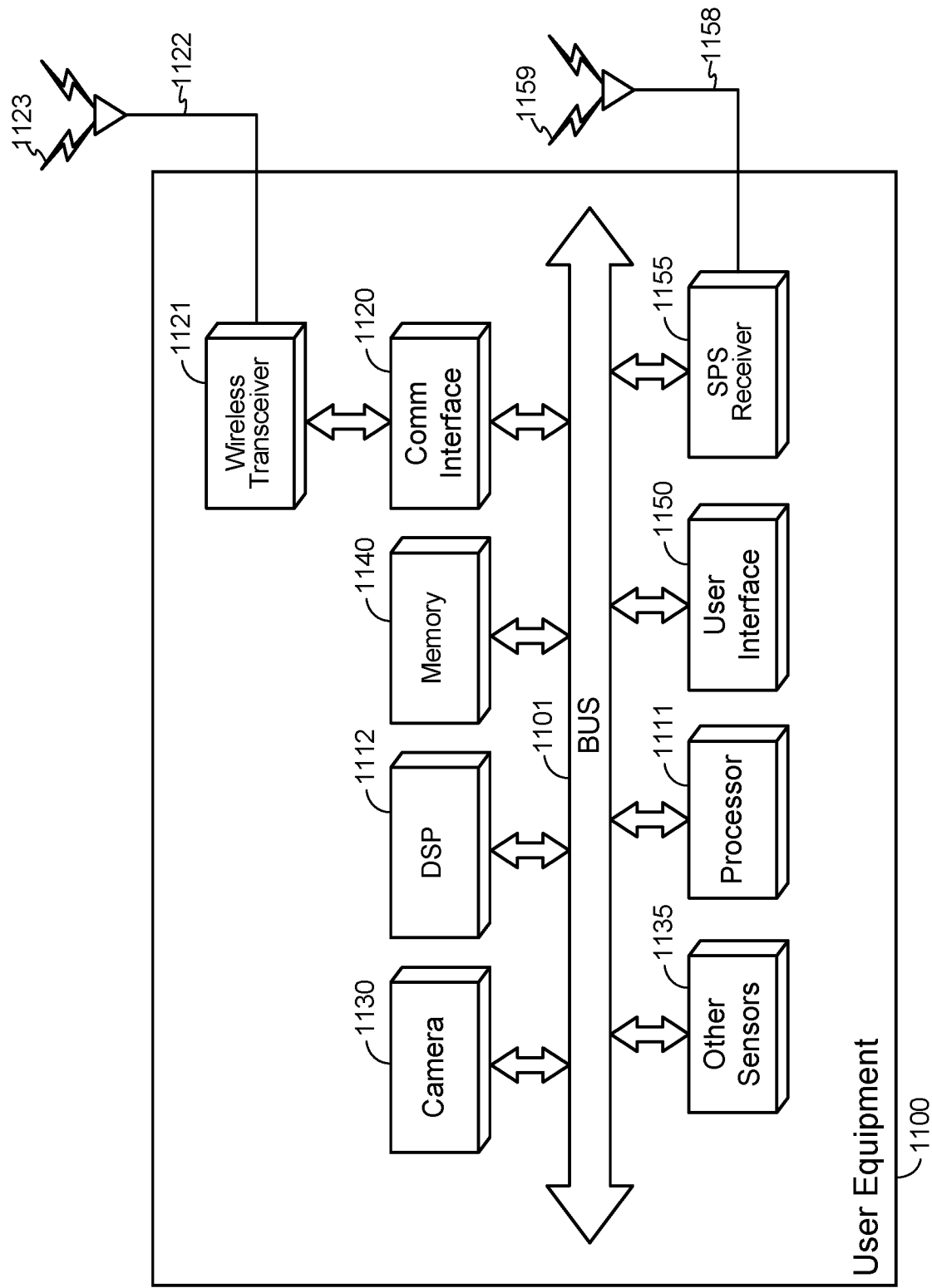
FIG. 11 is a block diagram of an example user equipment.

Referring to FIG. 11, a block diagram of an example user equipment (UE) 1100 is shown, for which various procedures and techniques described herein can be utilized. The UE 1100 may, in implementation and/or functionality, be similar to or the same as any of the other mobile devices described herein. For example, UE 1100 may correspond to any of mobile devices 208, UEs 405a-f or UE 602. Furthermore, the implementation illustrated in FIG. 11 may also be used to implement, at least in part, some of the nodes and devices illustrated throughout the present disclosure, including such nodes and devices as base stations (e.g. gNBs, ng-eNB, eNBs, etc.), location servers, and other components and devices illustrated in and described for FIGS. 1-6.

The UE 1100 includes a processor 1111 (or processor core) and memory 1140. As described herein, the UE 1100 is configured to receive and display wireless alert messages. The UE 1100 may optionally include a trusted environment operably connected to the memory 1140 by a public bus 1101 or a private bus (not shown). The UE 1100 may also include a communication interface 1120 and a wireless transceiver 1121 configured to send and receive wireless signals 1123 (which may include SIB12 messages) via a wireless antenna 1122 over a wireless network. The wireless transceiver 1121 may be a means for receiving a warning message broadcast from a base station in a wireless network. The wireless transceiver 1121 is connected to the bus 1101 via the communication interface 1120. Here, the UE 1100 is illustrated as having a single wireless transceiver 1121. However, the UE 1100 can alternatively have multiple wireless transceivers 1121 and/or multiple wireless antennas 1122 to support multiple communication standards such as Wi-Fi, CDMA, Wideband CDMA (WCDMA), Long Term Evolution (LTE), 5G, NR, Bluetooth® short-range wireless communication technology, etc.

The communication interface 1120 and/or wireless transceiver 1121 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 1100 may also include a user interface 1150 (e.g., display, keyboard, touchscreen, graphical user interface (GUI), haptic sensors, audio output) configured to alert a user. For example, the user interface 1150 may be configured to display alerts in the form of text messaging or map information (e.g., a boundary line). The user interface 1150 may also be configured to provide alerts in other forms such as visual, audio, haptic, or radio output (e.g., BLUETOOTH, Wi-Fi message to a peripheral device) that are configured to provide the content of warning messages to one or more users. The user interface 1150 may be a means for providing a content of the warning message to a user. The UE 1100 may include a Satellite Positioning System (SPS) receiver 1155 that receives SPS signals 1159 (e.g., from SPS satellites) via an SPS antenna 1158 (which may be the same antenna as wireless antenna 1122 or may be different). The SPS receiver 1155 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 1155 measures the SPS signals 1159 and may use the measurements of the SPS signals 1159 to determine the location of the UE 1100. The processor 1111, memory 1140, Digital Signal Processor (DSP) 1112 and/or specialized processor(s) (not shown) may also be utilized to process the SPS signals 1159, in whole or in part, and/or to compute (approximately or more precisely) the location of the UE 1100, in conjunction with SPS receiver 1155. Alternatively, the UE 1100 may support transfer of the SPS measurements to a location server that computes the UE location instead. Storage of information from the SPS signals 1159 or other location signals is performed using a memory 1140 or registers (not shown). While only one processor 1111, one DSP 1112 and one memory 1140 are shown in FIG. 11, more than one of any, a pair, or all of these components could be used by the UE 1100. The processor 1111 and DSP 1112 associated with the UE 1100 are connected to the bus 1101.

The memory 1140 can include a non-transitory computer-readable storage medium (or media) that stores functions as one or more instructions or code. Media that can make up the memory 1140 include, but are not limited to, RAM, ROM, FLASH, disc drives, etc. In general, the functions stored by the memory 1140 are executed by general-purpose processor(s), such as the processor 1111, specialized processors, such as the DSP 1112, etc. Thus, the memory 1140 is a processor-readable memory and/or a computer-readable memory that stores software (programming code, instructions, etc.) configured to cause the processor 1111 and/or DSP(s) 1112 to perform the functions described. Alternatively, one or more functions of the UE 1100 may be performed in whole or in part in hardware.

A UE 1100 can estimate its current position within an associated system using various techniques, based on other communication entities within view and/or information available to the UE 1100. For instance, the UE 1100 can estimate its position using information obtained from base stations (e.g. eNBs, gNBs, ng-eNBs), access points (APs) associated with one or more wireless local area networks (WLANs), personal area networks (PANs) utilizing a short-range wireless communication technology such as Bluetooth® wireless technology or ZIGBEE®, etc., Global Navigation Satellite System (GNSS) or other Satellite Positioning System (SPS) satellites, and/or map data obtained from a map server or other server, such as a Location Management Function (LMF), an Enhanced Serving Mobile Location Center (E-SMLC) or a Secure User Plane Location (SUPL) Location Platform (SLP). In some cases, a location server, which may be an E-SMLC, SLP or an LMF, etc., may provide assistance data to the UE 1100 to allow or assist the UE 1100 to acquire signals (e.g. signals from WLAN APs, cellular base stations, GNSS satellites, etc.) and make location related measurements using these signals. The UE 1100 may then provide the measurements to the location server to compute a location estimate (which may be known as "UE assisted" positioning) or may compute a location estimate itself (which may be known as "UE based" positioning) based on the measurements and possibly based also on other assistance data provided by the location server or by a cellular base station (e.g. such as orbital and timing data for GNSS satellites, configuration parameters for cellular base station signals, precise location coordinates of WLAN APs and/or cellular base stations for use in WLAN, OTDOA and/or ECID positioning, etc.).

In one embodiment, the UE 1100 may include a camera 1130 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 1130 may be configured to obtain and provide image information to assist in positioning of the UE 1100. In an example, one or more external image processing servers (e.g. remote servers) may be used to perform image recognition and provide location estimation processes. The UE 1100 may include other sensors 1135 which may also be used to compute, or used to assist in computing, a location for the UE 1100. The other sensors 1135 may include inertial sensors (e.g. accelerometers, gyroscopes, magnetometers, a compass, any of which may be implemented based on micro-electro-mechanical-system (MEMS), or based on some other technology), as well as a barometer, thermometer, hygrometer and other sensors.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method, at a mobile device, for providing a warning message, comprising:
   receiving a warning message broadcast from a base station in a wireless network, the warning message including a message identifier and an interior or exterior cell indication wherein the exterior cell indication comprises an inclusion of a definition of a geographic area in the warning message and the interior cell indication comprises an exclusion of the definition of the geographic area in the warning message; and
   providing a content of the warning message to a user based on a detection of the interior cell indication.

2. The method of claim 1, wherein the interior cell indication comprises an indication of a cell for which location verification of the mobile device is not needed and the exterior cell indication comprises an indication of a cell for which location verification of the mobile device is needed.

3. The method of claim 1, wherein the geographic area is a polygon, circle or ellipse.

4. The method of claim 1, further comprising;
   detecting the exterior cell indication in the warning message;
   determining a location estimate for the mobile device based on detecting the exterior cell indication; and
   determining whether the mobile device is within or outside the geographic area based on the location estimate.

5. The method of claim 4 and further comprising:
   determining that the mobile device is within the geographic area; and
   providing the content of the warning message to the user based on determining that the mobile device is within the geographic area.

6. The method of claim 4, wherein the warning message further includes an indication as to whether the mobile device shall or shall not provide the warning message to the user when unable to determine whether the mobile device is within or outside the geographic area and further comprising:
   determining that the mobile device may or may not be within the geographic area;
   providing the content of the warning message to the user when the indication indicates that the mobile device shall provide the warning message; and
   not providing the content of the warning message to the user when the indication indicates that the mobile device shall not provide the warning message.

7. The method of claim 4 wherein determining that the mobile device is within the geographic area comprises at least one of determining that the location estimate is within the geographic area, determining that the location estimate is within a threshold distance of and outside the geographic area, or determining that the location estimate is either within the geographic area or within the threshold distance of and outside the geographic area.

8. The method of claim 7, wherein the warning message includes the threshold distance.

9. The method of claim 7, wherein the location estimate includes an error component, wherein determining that the mobile device is within the geographic area comprises determining that the mobile device is within the geographic area with a threshold confidence.

10. The method of claim 4 and further comprising;
    determining that the mobile device is outside the geographic area;
    periodically reobtaining a new location estimate for the mobile device; and
    determining whether the mobile device has moved inside the geographic area based on the new location estimate.

11. The method of claim 10 and further comprising:
    determining that the mobile device has moved inside the geographic area; and
    providing the content of the warning message to the user based on determining that the mobile device has moved inside the geographic area.

12. The method of claim 10 wherein periodically reobtaining the new location estimate comprises reobtaining the new location estimate following an occurrence of a trigger event, wherein the trigger event includes at least one of an expiration of a periodic interval, a determination of a movement of the mobile device by more than a threshold distance from a previous location for the mobile device, receiving a new broadcast of the warning message, or receiving a new broadcast of the warning message after expiration of a threshold time interval following obtaining a previous location estimate for the mobile device.

13. The method of claim 10 and further comprising:
    ceasing to reobtain the new location estimate following at least one of an expiration of a maximum duration, ceasing to receive a broadcast of the warning message or performing a cell change or a handover to a new cell.

14. The method of claim 1, wherein the message identifier includes the interior or exterior cell indication.

15. The method of claim 1, wherein the base station is an evolved Node B (eNB), a next generation eNB (ng-eNB) or a New Radio Node B (gNB).

16. The method of claim 1 further comprising verifying the warning message is not a duplicate.

17. The method of claim 1 further comprising:
    determining whether the user has opted out of receiving the warning message; and
    upon a determination that the user has not opted out of receiving the warning message, providing the content of the warning message to the user based on the detection of the interior cell indication.

18. A device for receiving and displaying a warning message, comprising:
- a wireless transceiver configured to receive a warning message broadcast from a base station in a wireless network;
- at least one processor operably coupled to the wireless transceiver and configured to:
  - determine a message identifier and an interior or exterior cell indication based on the warning message, wherein the exterior cell indication comprises an inclusion of a definition of a geographic area in the warning message and the interior cell indication comprises an exclusion of the definition of the geographic area in the warning message; and
  - provide a content of the warning message to a user based on a detection of the interior cell indication.

19. The device of claim 18, wherein the interior cell indication comprises an indication of a cell for which location verification of the mobile device is not needed and the exterior cell indication comprises an indication of a cell for which location verification of the mobile device is needed.

20. The device of claim 18 wherein the at least one processor is configured to determine the geographic area based on the warning message.

21. The device of claim 20, wherein the geographic area is a polygon, circle or ellipse.

22. The device of claim 20, wherein the at least one processor is further configured to:
- determine the exterior cell indication based on the warning message;
- determine a location estimate for the device based on detecting the exterior cell indication; and
- determine whether the device is within or outside the geographic area based on the location estimate.

23. The device of claim 22, wherein the at least one processor is further configured to:
- determine that the device is within the geographic area; and
- provide the content of the warning message to the user based on determining that the device is within the geographic area.

24. The device of claim 22, wherein the at least one processor is further configured to:
- determine, based on an indication in the warning message, whether the device shall or shall not provide the warning message to the user when unable to determine whether the device is within or outside the geographic area;
- determine that the device may or may not be within the geographic area;
- provide the content of the warning message to the user when the indication indicates that the device shall provide the warning message; and
- not provide the content of the warning message to the user when the indication indicates that the device shall not provide the warning message.

25. The device of claim 22 wherein the at least one processor is configured to determine that the device is within the geographic area by at least one of determining that the location estimate is within the geographic area, determining that the location estimate is within a threshold distance of and outside the geographic area, or determining that the location estimate is either within the geographic area or within the threshold distance of and outside the geographic area.

26. The device of claim 25, wherein the at least one processor is configured to determine the threshold distance based on the warning message.

27. The device of claim 18, wherein the at least one processor is further configured to:
- determine whether the user has opted out of receiving the warning message; and
- upon a determination that the user has not opted out of receiving the warning message, providing the content of the warning message to the user based on the detection of the interior cell indication.

28. An apparatus for providing a warning message, comprising:
- means for receiving a warning message broadcast from a base station in a wireless network, the warning message including a message identifier and an interior or exterior cell indication, wherein the exterior cell indication comprises an inclusion of a definition of a geographic area in the warning message and the interior cell indication comprises an exclusion of the definition of the geographic area in the warning message; and
- means for providing a content of the warning message to a user based on a detection of the interior cell indication.

* * * * *